United States Patent
Xie et al.

(10) Patent No.: US 11,876,771 B2
(45) Date of Patent: Jan. 16, 2024

(54) MESSAGE DISPLAY METHOD AND APPARATUS, COMPUTER DEVICE, STORAGE MEDIUM, AND PROGRAM PRODUCT

(71) Applicant: TENCENT TECHNOLOGY (SHENZHEN) COMPANY LTD, Guangdong (CN)

(72) Inventors: Jiawen Xie, Guangdong (CN); Shenbin Zhu, Guangdong (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 0 days.

(21) Appl. No.: 18/314,377

(22) Filed: May 9, 2023

(65) Prior Publication Data
US 2023/0275866 A1 Aug. 31, 2023

Related U.S. Application Data

(63) Continuation of application No. PCT/CN2022/113543, filed on Aug. 19, 2022.

(30) Foreign Application Priority Data

Sep. 24, 2021 (CN) .......................... 202111124113.9

(51) Int. Cl.
*G06F 11/36* (2006.01)
*G06F 3/0482* (2013.01)
(Continued)

(52) U.S. Cl.
CPC ............ *H04L 51/52* (2022.05); *H04L 51/046* (2013.01); *H04L 51/212* (2022.05)

(58) Field of Classification Search
CPC ....... H04L 51/52; H04L 51/212; H04L 12/58; H04L 51/28; G06F 17/27; G06F 3/0482; G06F 11/36
(Continued)

(56) References Cited

U.S. PATENT DOCUMENTS

2005/0141880 A1* 6/2005 Tsujii ..................... G11B 27/36
386/326
2005/0196038 A1* 9/2005 Tanaka .................. G06T 11/203
382/168
(Continued)

FOREIGN PATENT DOCUMENTS

| CN | 103513890 A | 1/2013 |
|---|---|---|
| CN | 103164705 A | 6/2013 |
| CN | 105302834 A | 2/2016 |

OTHER PUBLICATIONS

International Search Report for PCT/CN2022/113543 dated Aug. 19, 2022.
Written Opinion for PCT/CN2022/113543 dated Aug. 19, 2022.

*Primary Examiner* — Jude Jean Gilles
(74) *Attorney, Agent, or Firm* — Sughrue Mion, PLLC

(57) ABSTRACT

A message display method and apparatus that can display a first message in an editing state; determine, in response to a selection operation on a candidate user account, a user account selected from the candidate user account as a participant user account of the first message; and display, after editing of the first message is completed, the first message including a first participant tag, the first participant tag being in a posted state, and the first participant tag being used for indicating that an object corresponding to the participant user account is a participant of message content of the first message.

20 Claims, 9 Drawing Sheets

(51) Int. Cl.
    *H04L 51/52*      (2022.01)
    *H04L 51/212*     (2022.01)
    *H04L 51/046*     (2022.01)
    *H04L 12/58*      (2006.01)
(58) Field of Classification Search
    USPC .......................................................... 709/206
    See application file for complete search history.

(56) References Cited

U.S. PATENT DOCUMENTS

| | | | | |
|---|---|---|---|---|
| 2006/0029025 | A1* | 2/2006 | Maehiro | G06Q 10/107 |
| | | | | 370/335 |
| 2014/0095933 | A1* | 4/2014 | Griesinger | G06F 11/3688 |
| | | | | 714/E11.208 |
| 2015/0026274 | A1* | 1/2015 | Chen | H04L 51/214 |
| | | | | 709/206 |
| 2017/0228363 | A1* | 8/2017 | Takahashi | G06F 1/163 |

* cited by examiner

MESSAGE DISPLAY METHOD AND APPARATUS, COMPUTER DEVICE, STORAGE MEDIUM, AND PROGRAM PRODUCT

CROSS-REFERENCE TO RELATED APPLICATION

This application is a continuation of International Application No. PCT/CN2022/113543 filed on Aug. 19, 2022 and claims priority to Chinese Patent Application No. 202111124113.9, filed with the China National Intellectual Property Administration on Sep. 24, 2021, the disclosure of both being incorporated by reference in their entireties.

FIELD

Embodiments of the disclosure relate to the field of Internet-based socializing, and in particular, to a message display method and apparatus, a computer device, a storage medium, and a program product.

BACKGROUND

A user posts various forms of messages on a network platform, for example, an online community post, a personal blog, or a short video. Taking a social circle message as an example, the user posts a live message to all or some friends in a social circle of the user on a social networking platform. The social circle message may be an image-text message, for example, includes nine images and one text.

In the related art, the user may select "Say to someone" or "notify" when posting a message that, for example, mentions a related user account when posting a microblog, to remind the related user account to view the message. The mentioned user account may receive a reminding message. However, the related user account is only reminded to view the message, and a social networking requirement of the user cannot be met.

SUMMARY

Embodiments of the disclosure provide a message display method and apparatus, a computer device, a computer storage medium, and a program product. A participant of a message may be tagged in the message.

Some embodiments of the disclosure provide a message display method, applied to a first client. A first user account may log-on to the first client. The method includes:
  displaying an editing state, wherein the editing state includes a first message;
  determining, in response to a selection operation on a candidate user account, a user account selected from the candidate user account as a participant user account of the first message; and
  displaying, after editing of the first message is completed, the first message including a first participant tag.

According to some embodiments of the disclosure, the first message including the first participant tag may be in a posted state. The first participant tag may be used for indicating that an object corresponding to the participant user account is a participant of message content of the first message.

Some embodiments of the disclosure provide a message display method, applied to a second client. A third user account logs on to the second client. The method includes:
  receiving a first message posted by a first user account; and
  displaying the first message, the first message including a second participant tag, and the second participant tag being used for indicating that an object corresponding to at least one participant user account is a participant of message content of the first message.

Some embodiments of the disclosure provide a message forwarding method. The method includes:
  receiving a first message posted by a first user account, the first message including a first participant tag, and the first participant tag being used for indicating that an object corresponding to a participant user account of the first message is a participant of message content of the first message; and
  transmitting the first message to a second client, a third user account logging on to the second client.

Some embodiments of the disclosure provide a message display method. The method includes:
  receiving a viewing operation on an aggregate display interface; and
  displaying at least one tag message aggregately on the aggregate display interface, the tag message including a message that is related to a sixth user account and that includes a participant tag, the sixth user account being a user account logging on to a current client, and the participant tag being used for indicating a participant of message content of the tag message.

Some embodiments of the disclosure provide a message display apparatus. A first user account logs on to the apparatus. The apparatus includes:
  a display module, configured to display a first message in an editing state; and
  a determining module, configured to determine, in response to a selection operation on a candidate user account, a user account selected from the candidate user account as a participant user account of the first message.

The display module may be further configured to display, after editing of the first message is completed, the first message including a first participant tag.

The first message includes the first participant tag being in a posted state. The first participant tag may be used for indicating that an object corresponding to the participant user account is a participant of message content of the first message.

Some embodiments of the disclosure provide a message display apparatus. A third user account logs on to the apparatus. The apparatus includes:
  a receiving module, configured to receive a first message posted by a first user account; and
  a display module, configured to display the first message, the first message including a second participant tag, and the second participant tag being used for indicating that an object corresponding to at least one participant user account is a participant of message content of the first message.

Some embodiments of the disclosure provide a message forwarding apparatus. The apparatus includes:
  a receiving module, configured to receive a first message posted by a first user account, the first message including a first participant tag, and the first participant tag being used for indicating that an object corresponding to a participant user account of the first message is a participant of message content of the first message; and a transmission module, configured to transmit the first message to a second client, a third user account logging on to the second client.

Some embodiments of the disclosure provide a message display apparatus. The apparatus includes:

a receiving module, configured to receive a viewing operation on an aggregate display interface; and a display module, configured to display at least one tag message aggregately on the aggregate display interface in response to the viewing operation, the tag message including a message that is related to a sixth user account and that includes a participant tag, the sixth user account being a user account logging on to a current client, and the participant tag being used for indicating a participant of message content of the tag message.

Some embodiments of the disclosure provide a computer device. The computer device includes a processor and a memory. The memory stores at least one instruction, at least one piece of program, a code set, or an instruction set. The at least one instruction, the at least one piece of program, the code set, or the instruction set being loaded and executed by the processor to implement the message display method or the message forwarding method provided in the embodiments of the disclosure.

Some embodiments of the disclosure also provide a computer-readable storage medium. The computer-readable storage medium stores at least one instruction, at least one piece of program, code set, or instruction set. The at least one instruction, the at least one piece of program, the code set, or the instruction set may be loaded and executed by a processor to implement the message display method or the message forwarding method provided in the embodiments of the disclosure.

Some embodiments of the disclosure provide a computer program product. The computer program product stores at least one instruction, at least one piece of program, a code set, or an instruction set. The at least one instruction, the at least one piece of program, the code set, or the instruction set may be loaded and executed by a processor to implement the message display method or the message forwarding method provided in the embodiments of the disclosure.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

DETAILED DESCRIPTION

Figure 1:
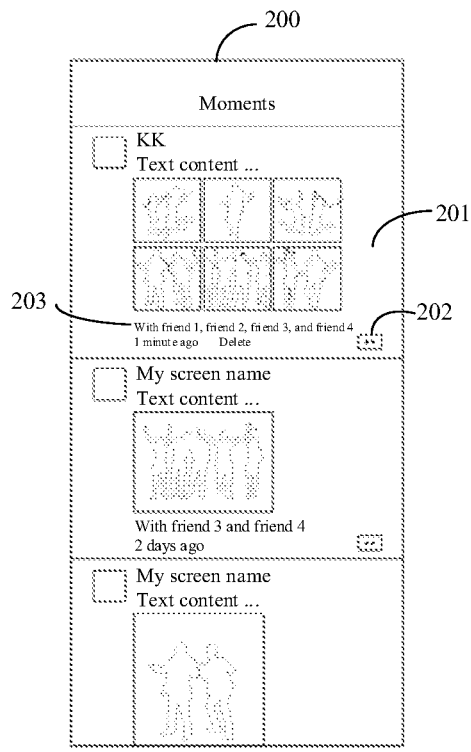
FIG. 1 is a schematic diagram of an interface in a method for displaying a social circle message according to some embodiments of this application.

To make objectives, technical solutions, and advantages of this application clearer, the following further describes implementations of this application in detail with reference to the accompanying drawings. The described embodiments are not to be construed as a limitation to the present disclosure. All other embodiments obtained by a person of ordinary skill in the art without creative efforts shall fall within the protection scope of the present disclosure.

The beneficial effects brought about by the technical solutions provided in the disclosure include: A participant of message content of a message may be selected from a candidate user account, and a participant tag for indicating the participant may be displayed in the posted message, so as to tag the participant in the message. This not only achieves a recording purpose better by tagging the participant of the message, but also enriches dimensions of information carried in the message, adds valid information carried in the message, and increases a utilization of a display resource of a device. In addition, the posed message includes the participant tag, so that the participant tag or another user can interact for the message, and interaction quality between users on a network platform may be improved.

In the description of the embodiments of this application, unless otherwise stated, "a plurality of" means two or more than two. "Some embodiments" involved in the following descriptions describe a subset of all possible embodiments. However, it may be understood that "some embodiments" may be the same or different subsets of all the possible embodiments, and may be combined with one another without conflicts.

The term "first/second" involved in the following descriptions is used only to distinguish between similar objects, and does not represent a specific order of the objects. It may be understood that "first/second" may be interchanged to a specific order if allowed to implement the embodiments of this application described herein in an order except the illustrated or described one. Terms involved in the embodiments of this application are first introduced.

Unfriend: "unfriend" means deleting a friend from contacts, thereby bilaterally releasing a social relationship between two user accounts. Neither party has a permission to access a social circle of the other after unfriending. For example, if a user account A deletes a user account B in a social association relationship (a friend relationship) with the user account A, contacts of the user account A do not include the user account B, contacts of the user account B may still include the user account A, but neither the user account A and the user account B can access Moments of the other.

Add to a contact blacklist (blacklist): "blacklist" means adding a user account of a friend to the contact blacklist, thereby unilaterally releasing a social relationship between two user accounts. Neither party has a permission to access a social circle of the other. For example, if the user account A blacklists the user account B, that is, adds the user account B to a contact blacklist, the contacts of the user account A do not include the user account B, the contacts of the user account B may still include the user account A, but neither the user account A and the user account B can access Moments of the other. A difference between blacklisting and unfriending lies in that if a friend is blacklisted, a social relationship may be resumed to normal only by removing the friend from the blacklist, and a chat message sent by the blacklisted friend to a blacklisting party may be rejected, and may also not be displayed by the blacklisting party; and if the friend is deleted, the social relationship may be resumed by friending again.

Hide my posts: after "hide my posts" is set for a friend, the friend does not have a permission to access a social circle of a setting user. For example, if the user account A sets "hide my posts" for the user account B, the user account B does not have a permission to access a social circle of the user account A, and other functions are not affected.

Hide his posts: it means blocking a social circle message of a friend. After "hide his posts" is set for a friend, a setting user does not have a permission to access a social circle of the friend. For example, if the user account A sets "hide his posts" for the user account B, the user account A does not have a permission to access a social circle of the user account B, and other functions are not affected.

Chats only: After "chats only" is set for a friend, both parties have only a permission to send messages to each other but no permission to access social circles of each other.

Memory photo album: the "Memory photo album" is used for displaying memories of a user and a friend based on a social circle message that is proposed in this application and that includes a participant tag. For example, a dedicated module is set in a personal photo album of the user to display a social circle message that is related to the user and that includes a participant tag.

An example in which a message is a moment message is used to briefly describe a message display method of this application. As shown in FIG. 1, a user account whose user name is "KK" edits image-text content of a moment message, and tags "friend 1", "friend 2", "friend 3", and "friend 4" as participants of the moment message. After the user account whose user name is "KK" posts the moment message, a display effect of the moment message may be shown by a moment message 201 on a moment browsing interface 200. A participant tag 203 "With friend 1, friend 2, friend 3, and friend 4" may be appended below the image-text content of the moment message. In addition, there may be a control 202 for liking, replying, and another operation. Moreover, friend 1, friend 2, friend 3, and friend 4 who are tagged as participants of the moment message may receive a reminding message indicating that they are tagged as the participants of the moment message. For example, a red circle with a number may be displayed at an entry of Moments, or a red dot representing the reminding message may be displayed around a desktop icon of an instant messaging client.

In addition, moment messages that are related to a user and that include participant tags are displayed concentratively in a "memory photo album" of the user, such that the user browses the moment messages including the participant tags more conveniently.

Figure 2:
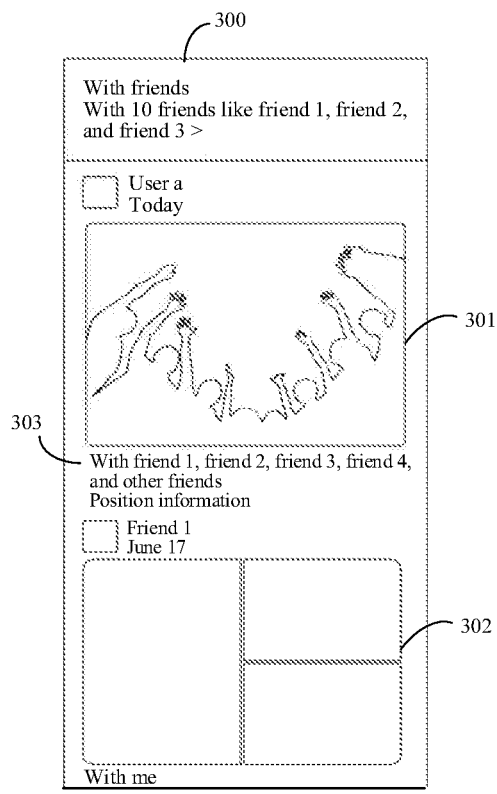
FIG. 2 is a schematic diagram of a memory photo album interface of a social circle message according to some embodiments of this application.

Schematically, FIG. 2 shows a memory photo album interface 300 of the user account A. A moment message 301 which is posted by the user account A and in which "friend 1", "friend 2", "friend 3", and "friend 4" are tagged as participants are displayed on the memory photo album 300. The participant tag 303 "With friend 1, friend 2, friend 3, and friend 4" is below the moment message 301. In addition to the social circle message that is posted by the user account A and that includes the participant tag, the memory photo album 300 further includes a social circle message which is posted by a friend of the user account and in which the user account A is tagged as a participant, for example, a social circle message 302 which is posted by a user account of "friend 1" and in which the user account A is tagged as a participant.

Figure 3:
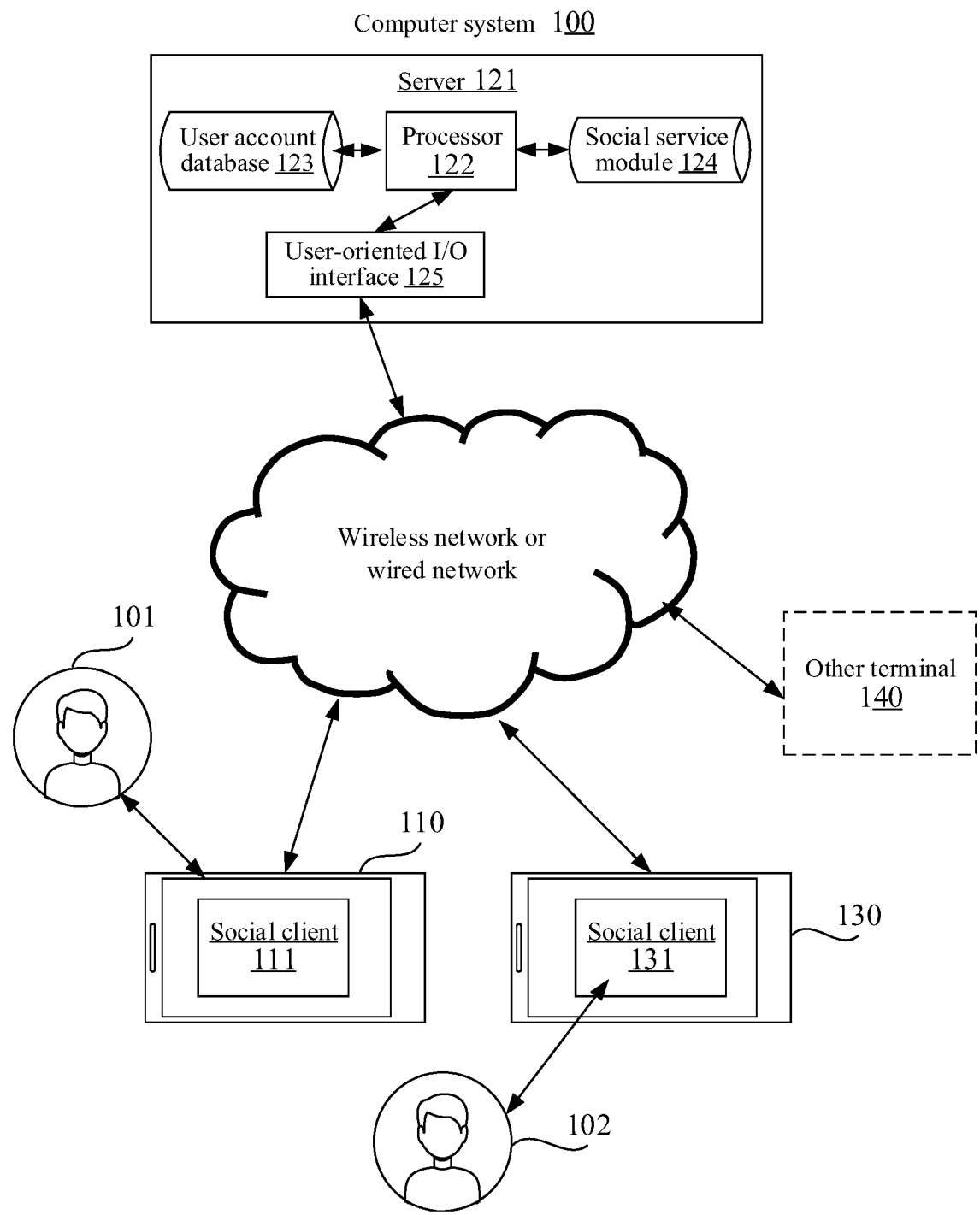
FIG. 3 is a block diagram of a structure of a computer system according to some embodiments of this application.

FIG. 3 is a block diagram of a structure of a computer system according to some embodiments of this application. The computer system 100 includes a first terminal 110, a server 120, and a second terminal 130.

A first client 111 supporting a social function may be installed and run in the first terminal 110. The first client 111 may be an application program or a web client that has the social function. When the first client 110 runs the first client 111, a user interface of the first client 111 may be displayed on a screen of the first terminal 110. The application program may be any one of an instant messaging program, a content publishing program, an online community program, a payment program, a shopping program, a social program, and a match-making program. In this embodiment of this application, an example in which the application program is the social program is used for description. The first terminal 110 is a terminal used by a first user 112. A first user account of the first user 112 logs on to the first client 111.

A second client 131 supporting the social function is installed and run in the second terminal 130. The second client 131 may be an application program or a web client that has the social function. When the second client 130 runs the second client 131, a user interface of the second client 131 is displayed on a screen of the second terminal 130. The application program may be any one of an instant messaging program, a microblog program, an online community program, a payment program, a shopping program, a dating program, and a match-making program. In this embodiment, an example in which the application program is a social program is used for description. The second terminal 130 is a terminal used by a second user 132. A second user account of the second user 132 logs on to the second client 131.

In some embodiments, the application programs installed in the first terminal 110 and the second terminal 130 are the same, or the application programs installed in the two terminals are the same type of application programs on different operating system platforms (Android or iOS). The first terminal 110 may generally be one of a plurality of terminals, and the second terminal 130 may generally be another of the plurality of terminals. In this embodiment, only the first terminal 110 and the second terminal 130 are used as an example for description. The first terminal 110 and the second terminal 130 are of the same or different device types. The device type include at least one of a smartphone, a tablet computer, an e-book reader, a moving picture experts group audio layer-3 (MP3) player, a moving picture experts group audio layer-4 (MP4) player, a portable laptop computer, and a desktop computer.

FIG. 1 shows only two terminals. However, in different embodiments, there may be another terminal 140 capable of accessing the server 120. In some embodiments, one or more terminals 140 are terminals corresponding to a developer. A development and editing platform for the clients supporting the social function is installed in the terminal 140. The developer may edit and update the clients on the terminal 140, and transmit updated application program installation packages to the server 120 through a wired or wireless network. The first terminal 110 and the second terminal 130 may download the application program installation packages from the server 120 to update the clients.

The first terminal 110, the second terminal 130, and the other terminal 140 are connected to the server 120 through the wireless network or the wired network.

The server 120 includes at least one of one server, a plurality of servers, a cloud computing platform, and a virtual center. The server 120 is configured to provide a background service for the client supporting the social function. In some embodiments, the server 120 undertakes primary computing work, and the terminal undertakes secondary computing work. In some embodiments, the server 120 undertakes secondary computing work, and the terminal undertakes primary computing work. In some embodiments, the server 120 and the terminal perform cooperative computing by using a distributed computing architecture.

In a schematic example, the server 120 includes a processor 122, a user account database 123, a social service module 124, and a user-oriented input/output (I/O) interface 125. The processor 122 is configured to load an instruction stored in server 121, and process data in the user account database 123 and the social service module 124. The user account database 123 is configured to store data of user accounts used by the first terminal 110, the second terminal 130, and the other terminal 140, for example, avatars of the user accounts, screen names of the user accounts, or groups in which the user accounts are. The social service module 124 is configured to provide a plurality of chat rooms (a two-person chat or a multi-person chat) for a user to perform instant messaging, for example, chatting, sending a sticker, or sending a red packet, or post and browse a social circle message. The user-oriented I/O interface 125 is configured to communicate with the first terminal 110 and/or the second terminal 130 for data exchange through the wireless network or the wired network.

The message display method provided in some embodiments of this application is described with reference to the above descriptions about an implementation environment. An example in which an execution entity of the method is a client run in a terminal shown in FIG. 3 is used for description. The terminal runs the client. The client is an application program supporting the social function.

Figure 4:
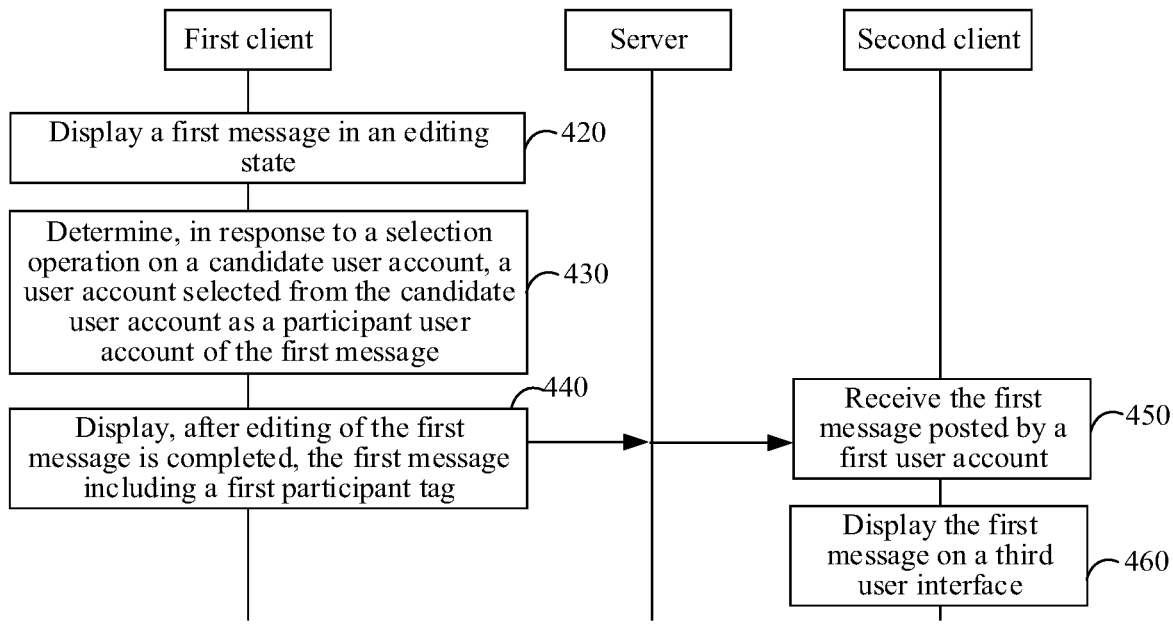
FIG. 4 is a flowchart of a message display method according to some embodiments of this application.

FIG. 4 is a flowchart of the message display method according to some embodiments of the disclosure. In this embodiment, an example in which the method is performed by the first client and the second client that are shown in FIG. 3 together is used for description. The first client is set in a first terminal. The second client is set in a second terminal. A first user account logs on to the first client. A third user account logs on to the second client. The method includes the following operations:

Operation 420: Display a first message in an editing state.

In actual applications, when a user wants to perform message editing based on the first client, the first terminal is triggered to display a first user interface (that is, a message editing interface), and message editing is performed based on the first user interface, to display the first message in the editing state on the first user interface. The first user interface is an interface displayed on the first client to edit a message. After the user starts editing, the first user interface includes the first message in the editing state. In some embodiments, the first user interface may further include an image addition control, a position addition control, a message permission setting entry, and the like.

Schematically, the first message may be at least one of a text message, an image message, a video message, an audio message, and a symbol message. For example, the first message may be a moment of a friend in a social circle, an article in a personal blog, a shot short video message, or a created song message.

For example, an object (user) corresponding to the first user account logging on to the first client taps a message addition control in a social application program, and the first user interface is displayed on the first client. The object corresponding to the first user account edits the first message on the first user interface by entering a text, inserting an image, selecting a current position coordinate, or the like.

Operation 430: Determine, in response to a selection operation on a candidate user account, a user account selected from the candidate user account as a participant user account of the first message.

The first message is a message that is displayed on the first user interface and that is in the editing state.

Here, there are at least two objects related to content of the first message. For example, when the content of the message includes an image, the image includes at least two objects, and a participant of the first message is at least one of the at least two objects. The candidate user account is a user account that may be selected as the participant of the message content of the first message.

In some embodiments, the first message is a social circle message, and the candidate user account is a user account in a social relationship with the first user account. For example, the candidate user account is a friend in contacts of the first user account. For another example, the candidate user account is a user account followed by the first user account. For another example, the candidate user account is a user account with a permission to access the social circle of the first user account. For another example, the candidate user account is any user account on a social networking platform that the first user account logs on to. A range of the candidate user account is not limited in the disclosure.

In some embodiments, the candidate user account is limited to be a user account satisfying a tagging condition in the contacts of the first user account, to avoid a case that the first user account selects the candidate user account as the participant user account of the first message but the candidate user account selected as the participant user account does not know. The tagging condition is that the user account has an access permission for the social circle of the first user account.

For example, the selection operation performed by the first user account on the candidate user account may be at least one of a single-click operation, a double-click operation, a check operation, a swipe-left operation, or a swipe-right operation on a list item corresponding to the candidate user account.

For example, the candidate user account is displayed on a participant selection user interface, and the participant selection user interface is a user interface to which the first terminal jumps through a trigger operation on a participant tagging entry on the first user interface. In some embodiments, the candidate user account is displayed on the first user interface in a form of a pop-up window. A user interface on which the candidate user interface is displayed is not limited in the disclosure.

In some embodiments, the first user interface includes the participant tagging entry. The participant selection user interface is displayed in response to the trigger operation on the participant tagging entry. The participant selection user interface includes at least one candidate user account. The user account selected from the candidate user account is determined as the participant user account of the first message in response to the selection operation on the candidate user account.

Operation 440: Display, after editing of the first message is completed, the first message including a first participant tag.

In actual applications, after editing of the first message is completed, when the user triggers a message posting instruction, the first terminal jumps to switch displaying of the first user interface to displaying of a second user interface, and displays, on the second user interface, the first message that is in a posted state and that includes the participant tag. The second user interface is a user interface displayed on the first client, and includes the first message in the posted state. In some embodiments, the second user interface further includes a message posted by another user account and a control configured to perform at least one operation on the posted message. For example, the operation may be replying, liking, or the like.

The first participant tag is used for indicating that an object corresponding to the participant user account is the participant of the message content of the first message.

For example, the first participant tag includes identification information (for example, a screen name or an avatar) corresponding to the participant user account and description information for representing participation.

In some embodiments, when the first client forwards the first message to the second client through the server, only the identification information related to the participant user account in the first participant tag is transmitted, but the description information for representing participation in the first participant tag is not transmitted. In this way, the number of bits for message transmission is reduced. Accordingly, after receiving the first message forwarded by the server, the second client adds the description information for presenting participation to a second participant tag to display the complete first message.

In some embodiments, the identification information corresponding to the participant user account may be a user name set for the participant user account, or an alias set by the first user account for the participant user account, other identification information, prefix, suffix, or the like customized by the first user account or the participant user account.

In some embodiments, the description information for representing participation may be preset information. In some embodiments, the first user account or the participant user account may customize the description information for representing participation.

In some embodiments, customization of the description information for representing participation by the first user account or the participant user account may be pre-customization suitable for participant tags in all messages before next customization, or real-time customization during posting of the first message. A rule of real-time customization is suitable for only the currently posted first message.

Schematically, the first user account tags a user account A, a user account B, and a user account C as participant user accounts of the first message. The description information for representing participation is preset to "with . . . ", and the first participant tag displayed on the second user interface is displayed to be "with the user account A, the user account B, and the user account C". In some embodiments, identification information corresponding to the second user account is set to be displayed to be an alias set by the first user account for the second user account, and the first participant tag displayed on the second user interface is "with a little brother, a good brother, and little C". Alternatively, the first user account customizes the description information for representing participation to be "happy with . . . ", and the first participant tag displayed on the second user interface is "happy with the user account A, the user account B, and the user account C", or the like. The identification information corresponding to the participant user account and the description information for representing participation in the first participant tag are not limited in the disclosure.

Operation 450: Receive the first message posted by the first user account.

For example, after completing editing and posting the first message, the first user account transmits the first message to the server. After receiving the first message, the server forwards the first message to the second client. The second client receives the first message posted by the first user account.

In some embodiments, after receiving the first message posted by the first user account, the server may forward the first message to the second client immediately, transmit the first message when the third user account logs on to the second client, or transmit the first message when the third user account opens a third user interface for refreshing.

The third user account logs on to the second client. The third user account may be a user account in a social relationship with the first user account. In some embodiments, the social relationship may be that the third account is a friend in the contacts of the first user account, the third user account follows the first user account on a social platform, the third user account has the access permission for the social circle of the first user account, or the like.

Operation 460: Display the first message on the third user interface.

The third user interface is a user interface displayed on the second client. The third user interface includes the first message posted by the first user account. In some embodiments, the third user interface may further include a message posted by another user account and a control for performing at least one operation on the message. For example, the operation may be liking, commenting, or the like.

In some embodiments, the first message including the first participant tag is displayed on the third user interface. That is, all user accounts tagged as participant user accounts are displayed in the first message.

In some embodiments, the first message including the second participant tag is displayed on the third user interface, and a user account indicated by the second participant tag is all or some user accounts indicated by the first participant tag. That is, all or some user accounts tagged as participant user accounts are displayed in the first message.

For example, the first message is displayed on the third user interface. The first message includes the second participant tag. The second participant tag is used for indicating that at least one participant user account is a participant of the message content of the first message.

In some embodiments, the message is a social circle message. In a context of socializing with acquaintances, a display condition of making the participant user account visible to a viewer is set, so as to enhance privacy of the participant user account.

For example, the first message including the second participant tag is displayed on the third user interface. The second participant tag includes a participant user account satisfying the display condition. The display condition includes at least one of the following conditions: the participant user account is the third user account; and the participant user account is in a social relationship with the third user account.

Schematically, the first user account tags the user account A and the user account B as participant user accounts of the first message. Therefore, the first participant tag is "with the user account A and the user account B". When the third user account is the user account A, and the user account A is in a social relationship with the user account B, the second participant tag is "with the user account A and the user account B". When the third user account is the user account A, and the user account A is not in a social relationship with the user account B, the second participant tag is "with the user account A and other friends". When the third user account D is in a social relationship with all the first user account, the user account A, and the user account B, the second participant tag is "with the user account A and the user account B". When the third user account D is in a social relationship with only the first user account and the user account A, the second participant tag is "with the user account A and other friends". When the third user account is in a social relationship with only the first user account, the second participant tag is "with friends".

In some embodiments, when the participant user account is the third user account, identification information corresponding to the third user account is displayed to be "me". For example, the identification information "me" corresponding to the third user account may be set to be preferentially displayed. That is, in the foregoing example, when the third user account is the user account A, and the user account A is in the social relationship with the user account B, the second participant tag is "with me and the user account B". When the third user account is the user account A, and the user account A is not in the social relationship with the user account B, the second participant tag is "with me and other friends".

Operation 420, operation 430, and operation 440 may be performed by the first client to form an independent embodiment, and operation 450 and operation 460 may be performed by the second client to form an independent embodiment. In some embodiments, the foregoing operations may be completed by the first client and the second client together to form a combined embodiment.

In summary, according to the message display method provided in this embodiment of the disclosure, the participant user account is selected from the candidate user account. The first message including the first participant tag is displayed on the second user interface. Moreover, the second client displays the first message on the third user interface after receiving the first message. According to the method provided in this embodiment of the disclosure, the user can tag a participant of message content of a message in the message. This enriches dimensions of information carried in the message, and adds valid information carried in the message. Not only can the user record time with friends by posting the message, but also interactions between user accounts are enhanced by tagging the participant, thereby improving interaction quality of the social circle.

An example in which a message is a social circle message is used in the following embodiment to describe the message display method provided in the embodiments of the disclosure. That is, a moment message in an instant messaging application is used as an example to present an interface of the message display method in the disclosure.

Figure 5:
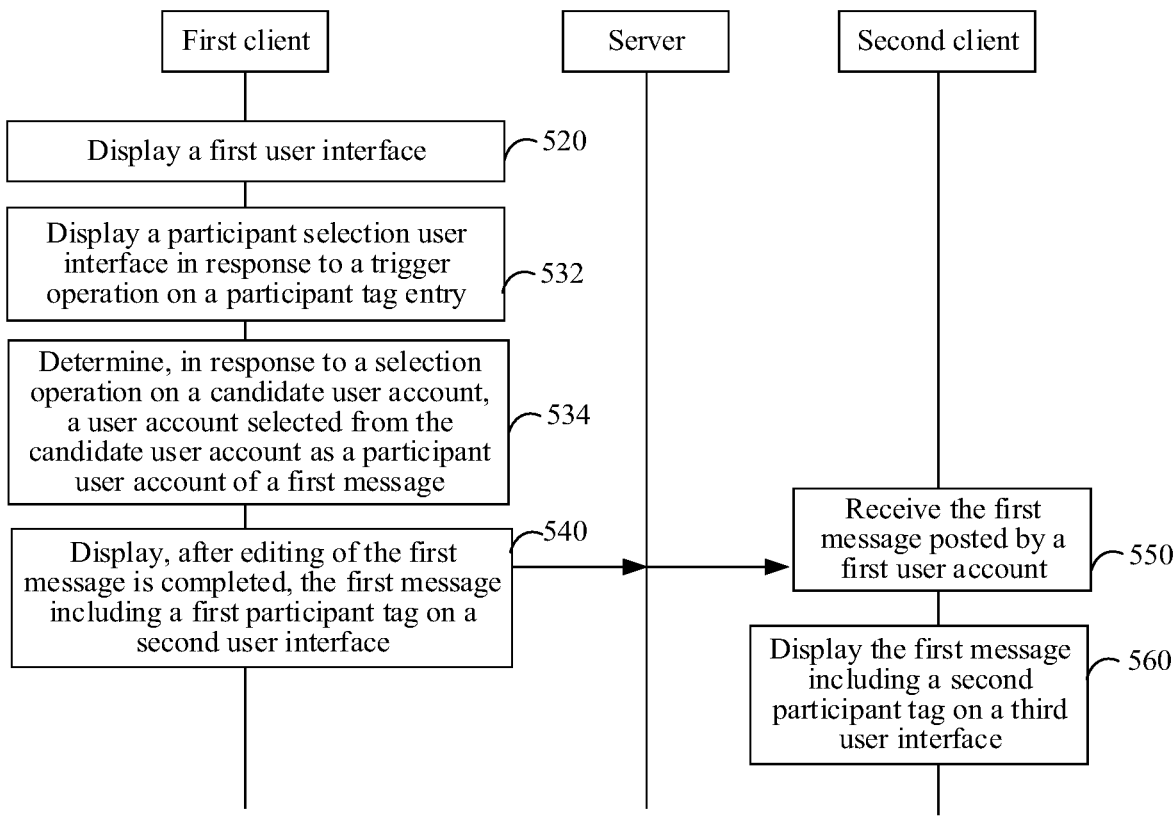
FIG. 5 is a flowchart of a message display method according to some embodiments of this application.

FIG. 5 is a flowchart of the message display method according to some embodiments of the disclosure. In this embodiment of the disclosure, an example in which the method is performed by the first client and the second client that are shown in FIG. 3 is used for description. A first user account logs on to the first client. A third user account in a social relationship with the first user account logs on to the second client. The method includes the following operations:

Operation 520: A terminal displays a first user interface.

The first user interface is an interface displayed on the first client, that is set in the terminal, to edit a social circle message. The first user interface includes a first message in an editing state. In some embodiments, the first user interface may further include an image addition control, a position addition control, a social circle message permission setting entry, and the like.

For example, the first user account logging on to the first client taps a social circle message addition control in a social application program, and the first user interface is displayed on the first client. The first user account edits the social circle message on the first user interface by entering a text, inserting an image, selecting a current position coordinate, or the like.

Figure 6:
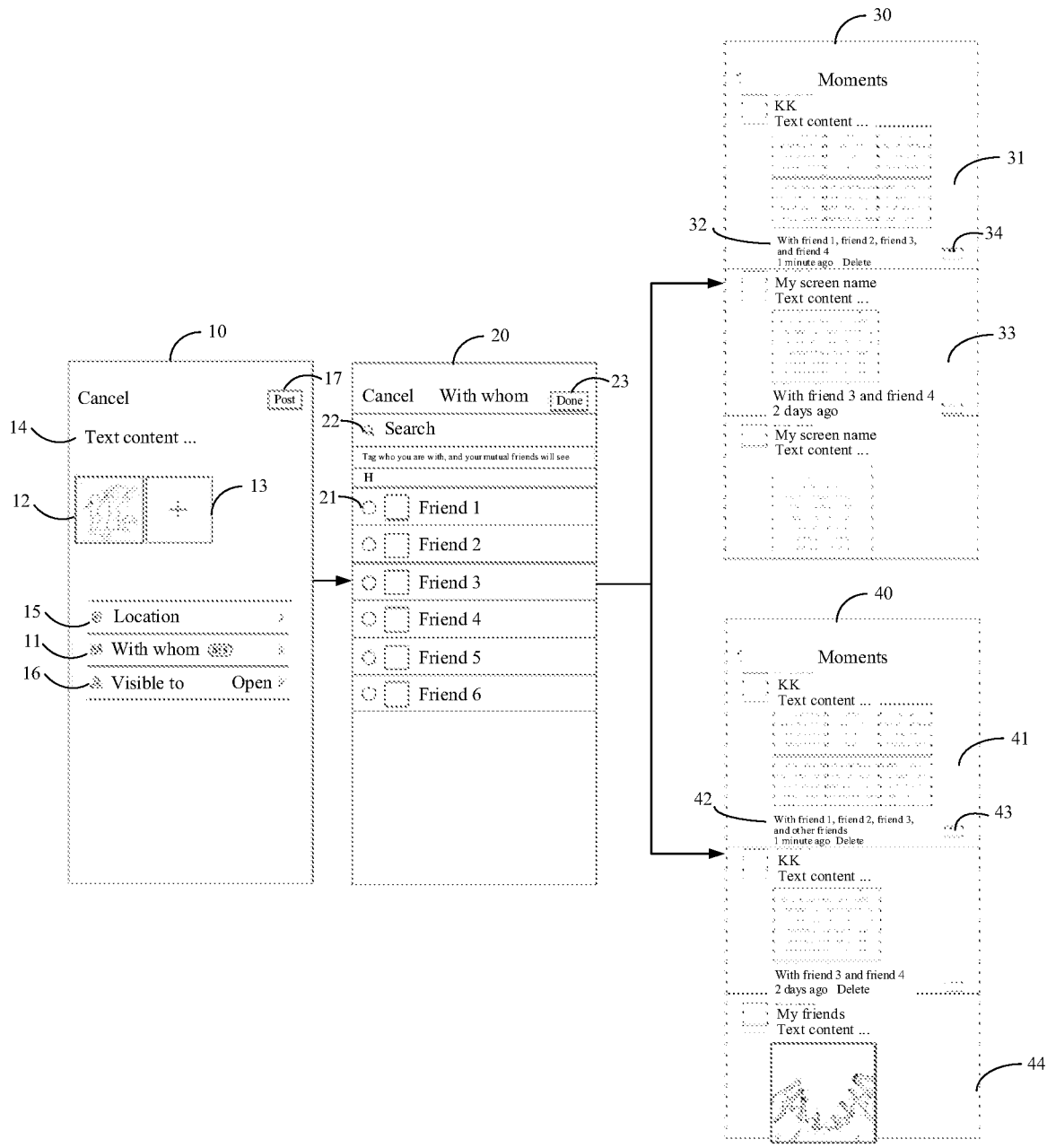
FIG. 6 is a schematic diagram of an interface in a social circle message display method according to some embodiments of this application.

For example, the first user interface displayed on the first client is shown by a moment message editing interface 10 shown in FIG. 6. It can be seen from the moment message editing interface 10 shown in the figure that the first user interface includes a participant tag entry 11, an image preview region 12, an image addition control 13, a text preview region 14, a position selection entry 15, a to-be-enabled moment message permission selection entry 16, a moment message posting control 17, and the like.

Operation 532: Display a participant selection user interface in response to a trigger operation on a participant tag entry.

For example, the first user interface includes the participant tag entry. The participant selection user interface is displayed in response to the trigger operation on the participant tag entry.

In some embodiments, only a candidate user account that may be tagged as a participant is displayed on the participant selection user interface. In some embodiments, all friend user accounts in contacts of the first user account are displayed on the participant selection user interface, but a user account that may not be tagged as a participant is grayed, and only a candidate user account that may be tagged as a participant is displayed in a selectable state.

In some embodiments, the candidate user account on the participant selection user interface is sorted in a phonetic order of a name corresponding to the user account, or in a phonetic order of an alias set by the first user account for the candidate user account.

In some embodiments, the participant selection user interface further includes a search control. The first user interface may fast select a participant that the first user account wants to tag from many friends by using a search function.

Schematically, as shown in FIG. 6, a participant selection user interface 20 is displayed in response to a trigger operation on the participant tag entry 11 on the moment message editing interface 10, that is, a trigger operation on a display region of "with whom" on the moment message editing interface 10. A candidate user account satisfying a tagging condition is displayed on the participant selection user interface 20. The candidate user account is arranged in a phonetic order of an alias set by the first user account for the friend user account of the first user account. In addition, the participant selection user interface 20 further includes a candidate user account selection control 21, a candidate user account search control 22, and a participant selection completion control 23.

Operation 534: Determine, in response to a selection operation on the candidate user account, a user account selected from the candidate user account as a participant user account of the first message.

The candidate user account is a user account that may be selected as the participant of the first message.

A range of the candidate user account is limited, so as to avoid a case that the first user account selects the candidate user account as the participant user account of the first message but the candidate user account selected as the participant user account does not know, which goes against the willingness of the participant user account.

For example, the candidate user account is a user account satisfying the tagging condition in the contacts of the first user account. The tagging condition is that the user account has an access permission for a social circle of the first user account. For example, the user account does not have the access permission for the social circle of the first user account in at least one of the following cases: the user account is added by the first user account to a contact blacklist; the user account is deleted by the first user account from the contacts; and the access permission of the user account for the social circle is revoked by the first user account.

For example, the first client filters a user account without the access permission out of the contacts, and determines a remaining user account after filtering as the user account satisfying the tagging condition. The user account without the access permission includes at least one of the following user accounts: a user account added to the contact blacklist by the first user account, that is, a user account in the contact blacklist of the first user account; a user account deleted by the first user account from the contacts; and a user account whose access permission for the social circle is revoked by the first user account.

An example in which the social application program is an instant messaging application is used. The candidate user account satisfying the tagging condition is a user account on which the first user account does not perform blacklisting or unfriending or for which the first user account does not set "hide my posts" in the contacts of the first user account.

Schematically, as shown in FIG. 6, the user account selected from the candidate user account is determined as the participant user account of the first message in response to a trigger operation on the candidate user account selection control 21 on the participant selection user interface 20. Then, the participant selection completion control 23 in the top-right corner of the participant selection user interface 20 is tapped to complete participant selection. The user interface jumps to the moment message editing interface 10. A user may continue to edit a moment message.

Operation 540: Display, after editing of the first message is completed, the first message including a first participant tag on a second user interface.

The second user interface is a user interface displayed on the first client to display a posted social circle message. The second user interface includes the first message in a posted state. In some embodiments, the second user interface further includes a social circle message posted by another user account in a social relationship with the first user account and a control for performing at least one operation on the posted social circle message. For example, the operation may be liking or commenting.

The first participant tag is used for indicating that an object corresponding to the participant user account is a participant of message content of the first message. The first participant tag includes identification information corresponding to the participant user account and description information for representing participation.

In some embodiments, the first user account tags the third user account in the social relationship with the first user account as the participant user account of the first message. A reediting entry is displayed in response to a posting operation on the first message based on a social relationship between the participant user account and the first user account is released. The first user interface is displayed in response to a trigger operation on the reediting entry. The first user interface includes the first message resumed to the editing state.

Schematically, the third user account actively releases the social relationship with the first user account, but the first user account does not know and still tags the third user account as the participant user account of the first message. After the first user account posts the first message, the reediting entry is displayed. After the first user account performs the trigger operation on the reediting entry, the first user interface is displayed, and the first message on the first user interface is resumed to an editable state.

In some embodiments, a notification message for indicating the first message fails to be posed is further displayed on the user interface in response to the posting operation on the first message. For example, the notification message is "the first message is not posted".

In some embodiments, a notification message for indicating a participant user account that does not satisfy a condition is further displayed on the user interface in response to the posting operation on the first message. For example, the notification message is "you have been deleted by a user account B".

In some embodiments, the reediting entry is displayed on the first user interface. For example, the reediting entry is displayed on the first user interface in a form of a pop-up window, and the first user account triggers the reediting entry to modify the participant user account of the first message or other content of the first message. In some embodiments, the reediting entry is displayed on the second user interface. That is, after the first user account selects to post the first message, the user interface jumps to the second user interface. However, since the first message fails to be posted, the reediting entry rather than the first message is displayed on the second user interface. After the first user account triggers the reediting entry, the user interface jumps to the first user interface, and the first user account may reedit the first message. In some embodiments, the reediting entry is displayed on a details user interface of the first message. For example, after the first user account selects to post the first message, a notification message control for indicating that the first message fails to be posted is displayed on the second user interface. The details user interface of the first message is displayed in response to a trigger operation on the notification message control. After the reediting entry on the details user interface is triggered, the first user interface is displayed. A display mode of the reediting entry is not limited in the disclosure.

In some embodiments, edited content of the first message resumed to the editable state, for example, image-text content, a position coordinate, or an enabled permission, remains unchanged, but the third user account whose social relationship with the first user account is released is automatically deleted from the participant user account.

Schematically, as shown in FIG. 6, after editing of the moment message is completed, the moment message posting control 17 on the moment message editing interface is tapped to post the moment message to Moments. A moment message 31 posted by the first user account is displayed on a Moments interface 30 of the first user account. The moment message 31 posted by the first user account carries a first participant tag 32. The first participant tag 32 includes identification information "Friend 3" and "Friend 4" corresponding to the participant user account selected by the first user account and description information "with . . . " for representing participation. As shown in the figure, the Moments interface 30 further includes a moment message 33 posted by a friend user account of the first user account, a control 34 for performing an operation such as replying or liking on the posted moment message, and the like.

Figure 7:
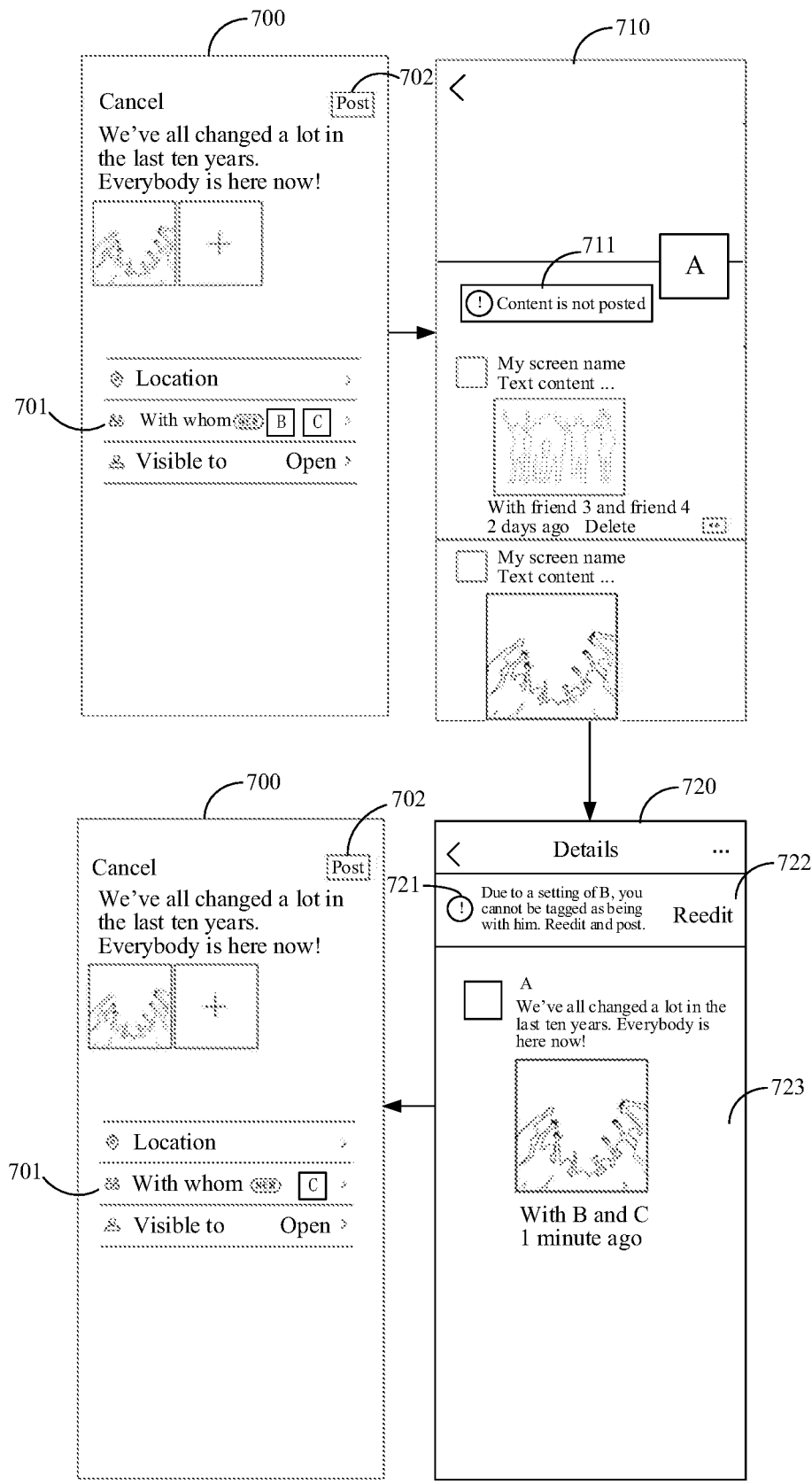
FIG. 7 is a schematic diagram of an interface on which a message is reedited for posting according to some embodiments of this application.

Schematically, as shown in FIG. 7, a user account A edits a moment message on a moment editing interface 700. By triggering a participant tag entry 701, the user tags friend user accounts B and C as participants of the moment message. The user account B has added the user account A to a contact blacklist or unfriended the user account A, but the user account A does not know. After completing editing, the user account A taps a posting control 702 to post the moment message. The user interface jumps to a moment message interface 710. Since the moment message fails to be posted, the moment message interface 711 does not display the moment message but displays a notification message for indicating that the moment message fails to be posted, for example, a notification message control 711 in FIG. 7. A text "content is not posted" is displayed on the notification message control 711. The notification message control 711 is tapped to jump to a details page 720 of the moment message that is not posted. A reason why the moment message fails to be posted is displayed on the details page 720, for example, a notification message 721 "Due to the setting of the user account B, you cannot tag being with him, and you can re-edited and then post" in the figure. Thus, it can be seen that the user account B has blacklisted or unfriended the user account A. A reediting entry 722 on the details page 720 is tapped to display the moment editing interface 700. The moment message resumed to the editable state is displayed on the moment editing interface 700. Image-text content, an enabled permission, a position tag, and other content of the moment message remain last editing results, but the user account B not satisfying a condition is automatically removed from a participant user tag. For example, only C displayed at the participant tag entry 701 shown in the figure remains as a participant user account.

Operation 550: Receive the first message posted by the first user account.

For example, after the first user account completes editing and posts the first message, the first client transmits the first message to a server for the server to forward to the second client. The second client receives the first message posted by the first user account.

In some embodiments, when the participant user account includes the third user account, the second client receives a reminding message transmitted by the server. The reminding message is used for indicating that the third user account is tagged as a participant user account of the first message.

Schematically, after the second client receives the reminding message, a red circle with a number is displayed around a desktop icon of the client, or a red dot is displayed at an entry of a third user interface, or the second client transmits the reminding message in a manner of a pop-up window. A reminding message display form of the second client is not limited in the disclosure.

Schematically, the second client receives the reminding message when online or getting online again. The second client transmits a refresh request to the server in response to that the third user account opens the third user interface. After receiving the refresh request transmitted by the second client, the server transmits the first message to the second client. The second client receives the first message.

The third user account in the social relationship with the first user account logs on to the second client.

In some embodiments, the third user account has the access permission for the social circle of the first user account.

An example in which the application program is an instant messaging application is used. The third user account is required to satisfy the following conditions to have the access permission for Moments of the first user account: the third user account and the first user account are friend user accounts in contacts of each other, that is, neither the first user account nor the third user account blacklists or unfriends each other; and the first user account does not set "hide my posts" for the third user account, and the third user account does not set "hide his posts" or "chats only" for the first user account.

In some embodiments, the first client forwards only the participant user account in the first participant tag to the second client through the server, so as to reduce the number of bits of the first message required to be transmitted. Therefore, the second client is required to add, based on the received participant user account, the corresponding description information for representing participation to generate a complete second participant tag, and further displays the complete first message on the third user interface.

Operation 560: Display the first message including the second participant tag on the third user interface.

The third user interface is a user interface displayed on the second client to display the social circle message. The third user interface includes the first message posted by the first user account. In some embodiments, the third user interface may further include a social circle message posted by another user account and a control for performing at least one operation, for example, liking or commenting, on the social circle message.

For example, the first message including the second participant tag is displayed on the third user interface. The second participant tag is used for indicating that at least one participant user account is a participant of the message content of the first message.

In some embodiments, a display condition of displaying the participant user account in the second participant tag is set, so as to enhance the privacy of the participant user account. For example, displaying of a user account not in a social relationship with the third user account is canceled.

For example, the first message including the second participant tag is displayed on the third user interface. The second participant tag includes a participant user account satisfying the display condition. The display condition includes at least one of the following conditions: the participant user account is the third user account; and the participant user account is in a social relationship with the third user account. That is, when the participant user account includes the third user account, identification information corresponding to the third user account and the participant user account in the social relationship with the third user account is displayed in the second participant tag. When the participant user account does not include the third user account, only identification information corresponding to the participant user account in the social relationship with the third user account is displayed in the second participant tag.

In some embodiments, the display condition further includes that: the participant user account is in the social relationship with the first user account; or the participant user account has the access permission for the social circle message of the first user account. That is, in the instant messaging application, the participant user account does not delete the first user account; the participant user account does not add the first user account to the contact blacklist, that is, the first user account is not in the contact blacklist of the participant user account; the participant user account does not delete the first user account from the contacts; the participant user account is not set to enable only a chat permission for the first user account; and the participant user account is not set to block the social circle message of the first user account.

For example, in addition to enhancing the privacy of the participant user account, more restrictive display conditions may be used to avoid information asymmetry caused by the fact that the participant user account cannot view the social circle message posted by the first user account. Therefore, the display condition further includes that the participant user account has the access permission for the social circle message of the first user account. Specifically, that the participant user account has the access permission for the social circle message of the first user account includes that: the participant user account does not add the first user account to a contact blacklist; the participant user account does not delete the first user account from the contacts; the participant user account is not set to enable only a chat permission for the first user account; and the participant user account is not set to block the social circle message of the first user account.

For another example, in addition to protecting the privacy of the participant user account and avoiding information asymmetry between the participant user account and the first user account, the willingness of the participant user account can also be expressed by setting the display condition. Therefore, the display condition further includes that the participant user account is not set to reject to be displayed as a participant of the message content of the first message.

In some embodiments, when the participant user account is the third user account, the identification information corresponding to the third user account is displayed to be "me". For example, the identification information "me" corresponding to the third user account may be set to be preferentially displayed.

For example, the second participant tag includes identification information corresponding to a participant user account satisfying the display condition and description information for representing participation, for example, "with little A and A Er", "with me and little D", "with friends", or "with big Q and other friends".

Based on the above descriptions about the display condition of the participant user account, Table 1 shows detailed texts displayed in corresponding second participant tags in different cases in a possible implementation. x represents a quantity of user accounts tagged as participant user accounts by the first user account, and y represents a quantity of user accounts satisfying the display condition.

TABLE 1

| Case | | | Text | Notes |
|---|---|---|---|---|
| y = 0 | | | With friends | Friends tagged to be with the first user account are all filtered, and information "with friends" is retained to avoid content ambiguities |
| y = 1 | Y includes a viewer | y < x | With me and other friends | Friends tagged to be with the first user account are all filtered, and information "with other friends" is added to avoid content ambiguities |
| | | y = x | With me | Only one friend is tagged to be with the first user account, who is the viewer |
| | Y does not include a viewer | y < x | With B and other friends | Friends tagged to be with the first user account are all filtered, and information "with other friends" is added to avoid content ambiguities |
| | | y = x | With B | Only one friend is tagged to be with the first user account, and B is a WeChat friend of the current viewer |
| y > 1 | Y includes a viewer | y < x | With me, B, and other friends | Some friends tagged to be with the first user account are all filtered, information "with other friends" is added to avoid content ambiguities, and the tagged friends include the viewer who is preferentially displayed |
| | | y = x | With me, B, C, and D | All tagged friends are not filtered and include the viewer, and thus are all displayed, with the viewer preferentially displayed |
| | Y does not include a viewer | y < X | With B, C, and other friends | Some friends tagged to be with the first user account are filtered, and information "with other friends" is added to avoid content ambiguities |
| | | y = x | With B, C, and D | Friends not tagged to be with the first user account are filtered, and tagged friends are all displayed |

The following specifically describes different cases in Table 1.

(1) y=0, that is, the quantity of user accounts satisfying the display condition is 0.

Since all user accounts tagged as participant user accounts by the first user account do not satisfy the display condition, the identification information specifically corresponding to the participant user account is not displayed. However, in order to avoid ambiguities of the first message caused by the fact that the participant tag is not displayed, information "with friends" is retained, and the text displayed in the second participant tag is "with friends". That is, when all participant user accounts do not satisfy the display condition, description information for representing that there is a participant participating in the message content of the first message is displayed in the second participant tag.

(2) y=1, that is, the quantity of user accounts satisfying the display condition is 1.

(a) The user account satisfying the display condition includes the third user account.

In this case, the user account satisfying the display condition is the third user account.

In case of y<x, that is, when another participant user account does not satisfy the display condition, in order to avoid ambiguities of the first message caused by the fact that the another participant user account is not displayed, information "with other friends" is added, and the text displayed in the second participant tag is "with me and other friends". That is, when the third user account is a participant user account satisfying the display condition, and there is a participant user account not satisfying the display condition, the identification information corresponding to the third user account and description information for representing that there is another participant participating in the message content of the first message are displayed in the second participant tag.

In case of y=x, that is, when the participant user account includes only the third user account and the third user account satisfies the display condition, the text displayed in the second participant tag is "with me". That is, when the third user account satisfies the display condition, and the participant user account includes only the third user account, the identification information corresponding to the third user account and description information for representing participation in the message content of the first message are displayed in the second participant tag.

(b) The user account satisfying the display condition does not include the third user account.

In this case, the user account satisfying the display condition is the user account B who is a friend of both the first user account and the third user account.

In case of y<x, that is, when some participant user accounts do not satisfy the display condition, in order to avoid ambiguities of the first message caused by the fact that another participant user account is not displayed, information "with other friends" is added, and the text displayed in the second participant tag is "with B and other friends". That is, when only one participant user account except the third user account satisfies the display condition, and there is another participant user account not satisfying the display condition, identification information corresponding to the participant user account satisfying the display condition and description information for representing that there is another participant participating in the message content of the first message are displayed in the second participant tag.

In case of y=x, that is, when the participant user account includes only the user account B and the user account B satisfies the display condition, the text displayed in the second participant tag is "with B". That is, when the participant user account includes only one user account except the third user account, and the user account satisfies the display condition, identification information corresponding to the participant user account and description information for representing participation in the message content of the first message are displayed in the second participant tag.

(3) y>1, that is, the quantity of user accounts satisfying the display condition is greater than 1.

(a) The user account satisfying the display condition includes the third user account.

In this case, the third user account and at least one other participant user account satisfy the display condition.

In case of y<x, that is, when there is another participant user account not satisfying the display condition, in order to avoid ambiguities of the first message caused by the fact that the another participant user account is not displayed, information "with other friends" is added. Taking y=2 as an example, the identification information corresponding to the third user account is preferentially displayed, and the text displayed in the second participant tag is "with me, B, and other friends". That is, when the third user account and at least one other user account are participant user accounts satisfying the display condition, and there is a participant user account not satisfying the display condition, the identification information corresponding to the user accounts satisfying the display condition and description information for representing that there is another participant participating in the message content of the first message are displayed in the second participant tag.

In case of y=x, that is, when the participant user account includes the third user account and all participant user accounts satisfy the display condition, the second participant tag includes identification information corresponding to all the participant user accounts. Taking y=4 as an example, the identification information corresponding to the third user account is preferentially displayed, and the text displayed in the second participant tag is "with me, B, C, and D". That is, when all the participant user accounts satisfy the display condition, and the third user account is a participant user account, identification information corresponding to all the participant user accounts and description information for representing participation in the message content of the first message are displayed in the second participant tag.

(b) The user account satisfying the display condition does not include the third user account.

In this case, the user account satisfying the display condition is more than one user account who is a friend of both the first user account and the third user account.

In case of y<x, that is, when some participant user accounts do not satisfy the display condition, in order to avoid ambiguities of the first message caused by the fact that another participant user account is not displayed, information "with other friends" is added, and Taking y=2 as an example, the text displayed in the second participant tag is "with B, C, and other friends". That is, when more than one user account except the third user account is a participant user account satisfying the display condition, and there is a participant user account not satisfying the display condition, identification information corresponding to the participant user account satisfying the display condition and description information for representing that there is another participant participating in the message content of the first message are displayed in the second participant tag.

In case of y=x, that is, when all the participant user accounts satisfy the display condition, the second participant tag includes identification information corresponding to all the participant user accounts. Taking y=3 as an example, the text displayed in the second participant tag is "with B, C, and D". That is, when all the participant user accounts satisfy the display condition, and the participant user accounts do not include the third user account, identification information corresponding to all the participant user accounts and description information for representing participation in the message content of the first message are displayed in the second participant tag.

In some embodiments, to respect the willingness of the participant user account, the participant user account may select whether to reject to be displayed as a participant of the first message.

For example, when the participant user account includes the third user account, displaying of the identification information corresponding to the third user account in the second participant tag is canceled in response to a display rejection operation on the first message.

Schematically, as shown in FIG. 6, a Moment interface 40 of the third user account is displayed on the second client. The Moments interface 40 of the third user account includes a first message 41 posted by the first user account, a second participant tag 42 in the first message, a control 43 for an operation such as liking and replying, and a comment message 44 posted by another friend user account. In a case shown in FIG. 6, the third user account is a friend of the first user account, friend 1, friend 2, and friend 3, but the third user account is not in a friend relationship with friend 4, and when none of friend 1, friend 2, and friend 3 does not reject to be displayed as a participant, an obtained second participant tag 42 is "With friend 1, friend 2, and friend 3".

Figure 8:
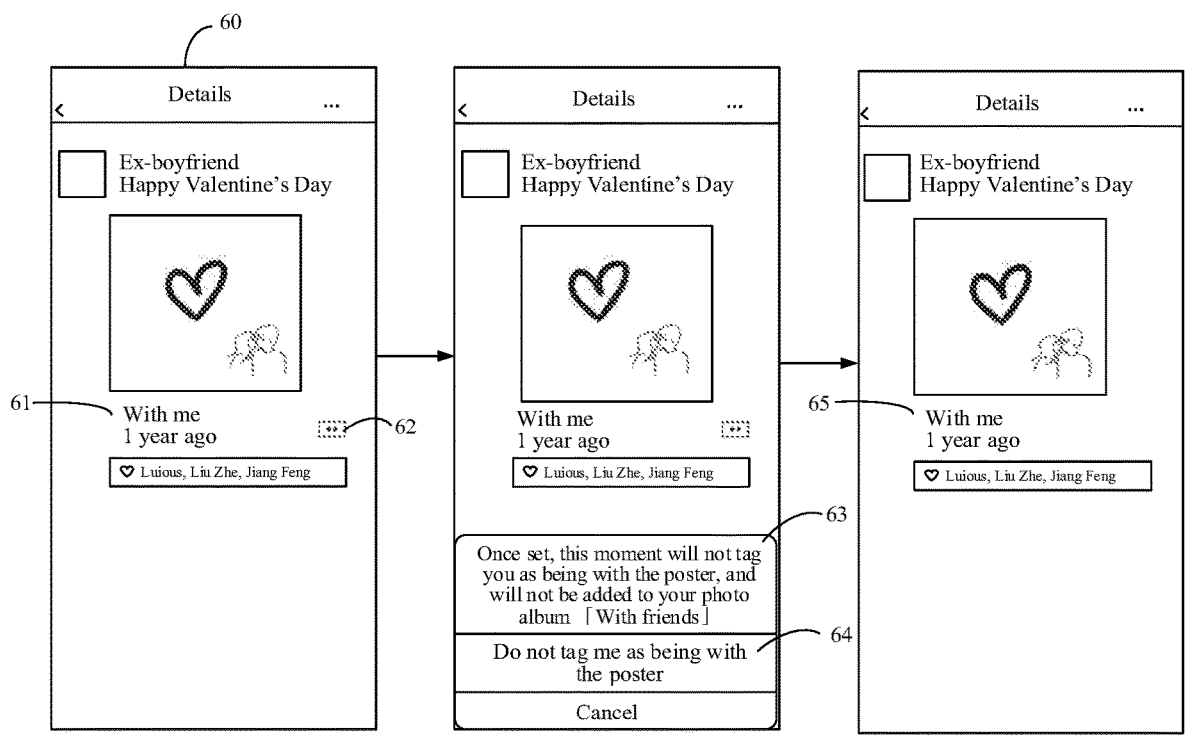
FIG. 8 is a schematic diagram of an interface on which a participant user account performs a display rejection operation according to some embodiments of this application.

Schematically, as shown in FIG. 8, a details page 60 of the moment message posted by the first user account is displayed on the second client. A participant tag 61 of the moment message includes only the third user account, that is, "with me" is displayed. A display rejection control 62 on the details page 60 is tapped, and then a pop-up window 63 is displayed at the bottom of the details page 60. The pop-up window 63 is used for asking the third user account whether to confirm to perform a display rejection operation. By tapping the display rejection operation region 64, the third user account confirms to reject to be displayed as a participant of the moment message, and then "with friends" is displayed as a new participant tag 65.

Operation 520, operation 532, operation 534, and operation 540 may be performed by the first client to form an independent embodiment, and operation 550 and operation 560 may be performed by the second client to form an independent embodiment. In some embodiments, the foregoing operations may be completed by the first client and the second client together to form a combined embodiment.

In summary, according to the message display method provided in this embodiment of the disclosure, the participant tag entry on the first user interface is triggered to display the participant selection user interface. The participant user account of the first message is selected from the candidate user account by using the selection operation on the candidate user account. After the first message is posted, the first client displays the first message including the first participant tag on the second user interface, and the second client displays the first message including the second participant tag on the third user interface. In this method, the participant tag may be added to the social circle message to enrich dimensions of information carried in the message and increase a utilization of a display resource of a device. In addition, the social circle message can record time of the user with friends, colleagues, and families better, and interactions between user accounts can be promoted.

In addition, according to the method provided in this embodiment of the disclosure, the tagging condition is set, so that the first user account cannot perform a participant tagging operation on a blacklisted or unfriended contact friend, or the like. This avoids frequent disturbances of a non-friend user account on a social platform as well as information asymmetry or misunderstanding of another user caused by the fact that a user account tagged as a participant cannot access the social circle of the first user account, and improves interaction quality between user accounts.

Moreover, according to the method provided in this embodiment of the disclosure, the display condition is set, so that a user account tagged as a participant is visible to only some friend user accounts satisfying the display condition. This enhances privacy protection of the user in a social situation.

Furthermore, according to the method provided in this embodiment of the disclosure, a user account tagged as the participant independently selects whether to be displayed. This can reflect the socializing willingness of the user better, and improves the socializing quality.

The above describes in detail how to tag, in a message, a user account participating in the message as a participant of the message and how to display a participant tag respectively from an angle of a poster and an angle of a viewer. Clearly, the message including the participant tag is a good memory of the user with a friend. Therefore, the message that is related to the user and that includes the participant tag may be displayed in a form of an aggregate display page (a "memory photo album"), to make it more convenient for the user to browse such messages. The following describes the aggregate display page (the "memory photo album"), respectively from angles of access of the user to a first aggregate display interface of the user and to a second aggregate display interface of another user account.

In some embodiments, at least one first tag message is displayed aggregately on the first aggregate display interface. The first tag message includes a message that is related to the first user account and that includes a participant tag. That is, the first user account accesses the "memory photo album" of the first user account on the first aggregate display interface.

The first tag message includes at least one of the following:
  a message that is posted by the first user account and that includes a participant tag; and
  a message posted by another user account except the first user account, a participant tag corresponding to the message including the first user account.

Figure 9:
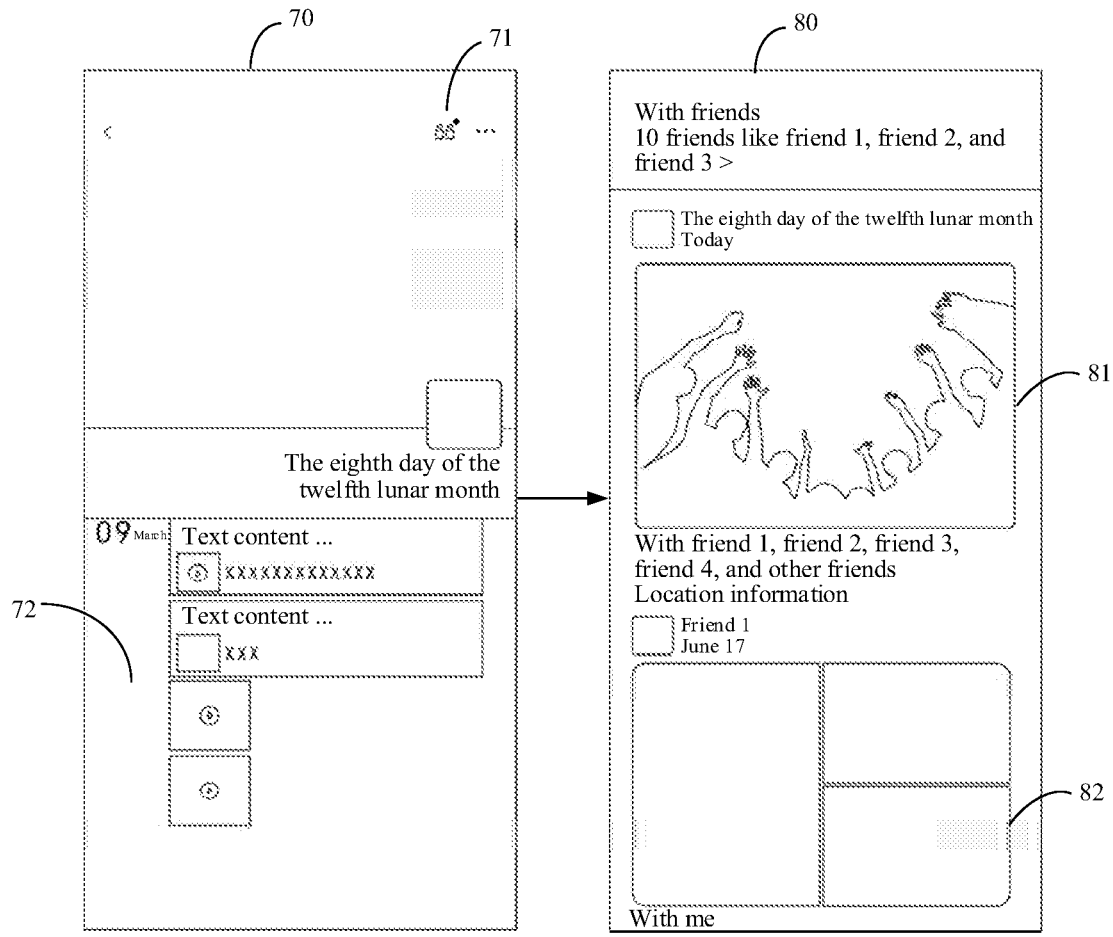
FIG. 9 is a schematic diagram of an aggregate display interface (memory photo album) of a social circle message according to some embodiments of this application.

As shown in FIG. 9, the first user account logging on to the first client enters a personal photo album interface 70 of the first user account. The personal photo album interface 70 of the first user account includes a first aggregate display interface entry 71 and all messages 72 posted by the first user account. A first aggregate display interface 80, that is, the "memory photo album" of the first user account, is displayed on the first client in response to a trigger operation on the first aggregate display interface entry 71. A message 81 that is posted by the first user account and that includes a participant tag and a message 82 that is posted by another user account except the first user account and whose participant tag includes the first user account are displayed on the first aggregate display interface 80.

In some embodiments, when the message is a social circle message, the social circle messages displayed on the first aggregate display interface are screened and updated according to a current latest social relationship of the first user account, so as to meet a requirement of a user in the social circle for privacy.

For example, the first tag message includes a second message posted by the second user account. A participant user account of the second message includes the first user account. Displaying of the second message on the first aggregate display interface is canceled based on the social relationship between the first user account and the second user account is released.

Taking the social circle message 82 in FIG. 9 as an example, the social circle message 82 is the second message posted by the second user account, that is, "friend 1", and a participant user account of the second message includes the first user account. If the social relationship between the first user account and the second user account is released, for example, the first user account deletes the second user account from the contacts, displaying of the social circle message 82 on the first aggregate display interface 80 is canceled.

In addition, the disclosure provides a social circle message display method for a purpose of advocating the user to record and cherish time with friends, family members, colleagues, and the like. Content of the social circle message is mainly a group photo of persons. As many images as possible may be displayed in limited space, so as to enable the first aggregate display interface to highlight an atmosphere in which a plurality of persons participate.

In some embodiments, the first aggregate display interface uses a multi-image merged display mode. For example, in the multi-image merged display mode shown by the social circle message 82 in FIG. 8, three images are merged and displayed in a manner of one large image plus two small images. In addition, a mode of simultaneously displaying two images or nine images, preferentially displaying a group photo of persons, or the like may be selected. The multi-image merged display mode is not limited in the disclosure.

In another embodiment, the third user account logging on to the second client triggers a second aggregate display interface entry on a personal photo album interface of a fourth user account, and then the second aggregate display interface is displayed on the second client. That is, the third user account accesses a "memory photo album" of the fourth user account.

For example, at least one second tag message is displayed on the second aggregate display interface. The second tag message includes a message that is related to the third user account and the fourth user account and that includes a participant tag. The fourth user account is a user account currently accessed by the third user account.

For example, the second tag message includes at least one of the following:

a message posted by the third user account, a participant user account corresponding to the message including the fourth user account;
a message posted by the fourth user account, a participant user account corresponding to the message including the third user account; and
a message posted by another user, a participant user account corresponding to the message including both the third user account and the fourth user account.

That is, the second aggregate display interface includes at least one of the following:

a message that is posted by a current viewer and in which the visited is tagged as a participant;
a message that is posted by the visited and in which the current viewer is tagged as a participant; and
a message that is posted by a friend of both the current viewer and the visited and in which both the viewer and the visited are tagged as participants.

In some embodiments, when the message is a social circle message, the social circle message displayed on the second aggregate display interface is screened and updated according to current latest social relationships of the third user account and the fourth user account, so as to meet the requirement of the user in the social circle for privacy.

For example, the second tag message includes a third message posted by a fifth user account, and a participant of the third message includes the third user account and the fourth user account. That is, the fifth user account is a friend of both the third user account and the fourth user account, and the third message is a social circle message that is posted by the fifth user account and in which both the third user account and the fourth user account are tagged as participant user accounts. Displaying of the third message on the second aggregate display interface is canceled based on a social relationship with the fifth user account is released. In some embodiments, displaying of the third message on the second aggregate display interface is canceled based on a social relationship between the fourth user account and the fifth user account is released.

In some embodiments, in order not to go against the willingness of the participant user account, the participant tag in the social circle message displayed on the second aggregate display interface also complies with the above-mentioned rule that the participant user account may refuse to be displayed. That is, the participant user account of the social circle message may independently select whether the identification information corresponding to the participant user account is displayed in the participant tag.

Schematically, when a user 2 and a user 3 in a message posted by a user 1 are tagged as participants of the message, and the user 3 rejects to be displayed as the participant of the message, a participant tag displayed on a first aggregate display interface of the user 1 is "with the user 2 and the user 3", and a participant tag displayed on a second aggregate display interface on which a user 4 accesses a "memory photo album" of the user 1 is "with the user 2 and other friends".

In addition, the disclosure provides the message display method for a purpose of advocating the user to record and cherish time with friends, family members, colleagues, and the like. Content of the message is mainly a group photo of persons. As many images as possible may be displayed in limited space, so as to enable the aggregate display interface to highlight an atmosphere in which a plurality of persons participate. In some embodiments, the aggregate display interface uses the multi-image merged display mode, for example, a mode of simultaneously displaying two images, three images, or nine images, displaying a group photo of persons in a scaling-up manner, or preferentially displaying a group photo of persons. The multi-image merged display mode is not limited in the disclosure.

Figure 10:
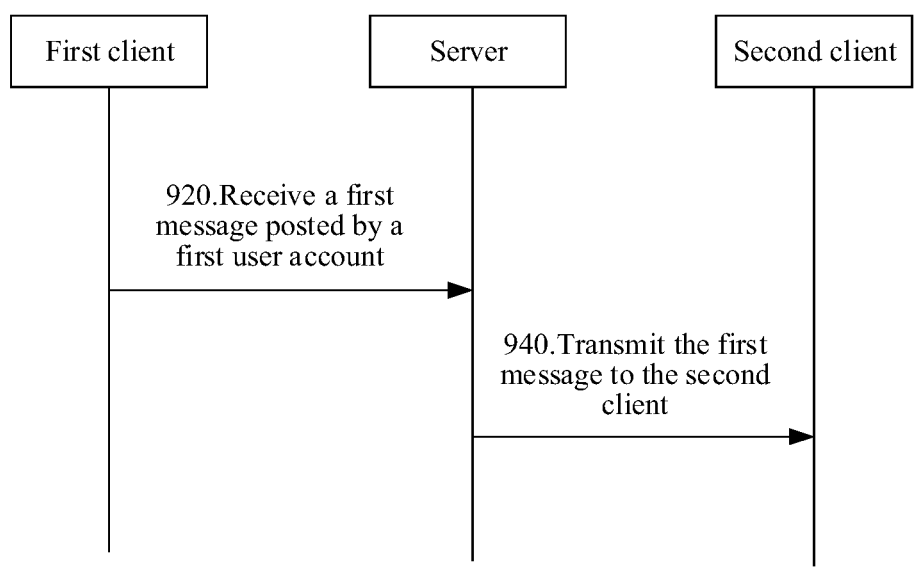
FIG. 10 is a flowchart of a message forwarding method according to some embodiments of this application.

FIG. 10 is a flowchart of a message forwarding method according to some embodiments of the disclosure. In this embodiment, an example in which the method is performed by a server is used for description. The method includes the following operations:

Operation 920: Receive a first message posted by a first user account.

The first message includes a first participant tag. The first participant tag is used for indicating a participant user account of the first message.

After the first user account logging on to a first client completes editing the first message, and selects to post the first message, the first client transmits the first message to the server.

For example, the server receives the first message posted by the first user account.

Operation 940: Transmit the first message to a second client.

A third user account logs on to the second client.

In some embodiments, the third user account is a user account in a social relationship with the first user account.

For example, a user account satisfying a display condition is screened from the participant user account of the first message. A second participant tag of the first message is generated according to the user account satisfying the display condition. A first message including the second participant tag is transmitted to the second client.

For example, the display condition includes at least one of the following conditions: the participant user account is the third user account; and the participant user account is in a social relationship with the third user account.

In some embodiments, the display condition further includes at least one of the following: the participant user account has an access permission for a social circle message of the first user account; and the participant user account is not set to reject to be displayed as a participant of message content of the first message.

In actual applications, that the participant user account has the access permission for the social circle message of the first user account includes that: the participant user account does not add the first user account to a contact blacklist, that is, the first user account is not in the contact blacklist of the participant user account; the participant user account does not delete the first user account from the contacts; the participant user account is not set to enable only a chat permission for the first user account; and the participant user account is not set to block the social circle message of the first user account.

For example, the server obtains a social relationship of the third user account, a permission enabling relationship between the first user account and the participant user account, and a display rejection operation record of the participant user account. Then, the server screens the user account satisfying the display condition according to the social relationship of the third user account, the permission enabling relationship between the first user account and the participant user account, and the display rejection operation record of the participant user account. Next, the server generates the second participant tag of the first message according to the screened user account satisfying the display condition. Finally, the server transmits the first message including the second participant tag to the second client.

In some embodiments, a rule for the server to generate the second participant tag of the first message according to the user account satisfying the display condition may refer to Table 1 specifically described in the foregoing embodiment, and will not be elaborated herein.

In actual applications, the server transmits only identification information of the screened user account satisfying the display condition but not description information for representing participation in the second participant tag to the second client, so as to reduce the number of bits for message transmission. Accordingly, after receiving the first message transmitted by the server, the second client adds the description information for presenting participation to the second participant tag to display the complete first message.

In some embodiments, after receiving the first message posted by the first user account, the server may forward the first message to the second client immediately, transmit the first message when the third user account logs on to the second client, or transmit the first message when the third user account opens a third user interface for refreshing.

In some embodiments, when the participant user account includes the third user account, the server transmits a reminding message to the second client. The reminding message is used for indicating that the third user account is tagged as the participant user account of the first message.

Figure 11:
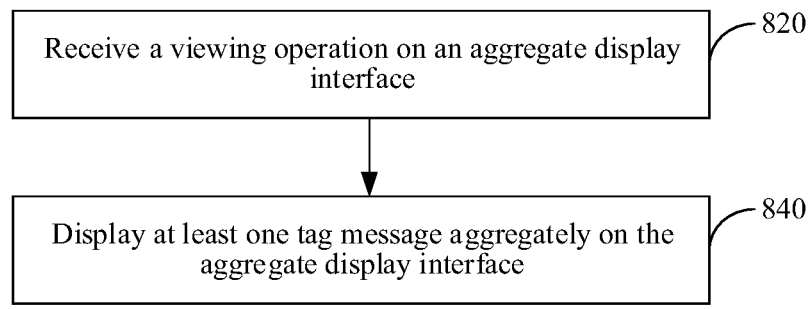
FIG. 11 is a flowchart of a message display method according to some embodiments of this application.

FIG. 11 is a flowchart of a message display method according to some embodiments of the disclosure. In this embodiment, an example in which the method is performed by a client shown in FIG. 3 is used for description. The client is set in a terminal. A sixth user account logs on to the current client. The method includes the following operations:

Operation 820: Receive a viewing operation on an aggregate display interface.

For example, the viewing operation on an aggregate display interface entry is received in response to a trigger operation on the aggregate display interface entry.

The aggregate display interface includes a third aggregate display interface and a fourth aggregate display interface. The third aggregate display interface is used for displaying a message that is related to a user account logging on to the current client and that includes a participant tag. The fourth aggregate display interface is used for displaying a message that is related to the user account logging on to the current client and a currently accessed user account and that includes a participant tag. That is, the sixth user account logging on to the current client browses, on the third aggregate display interface, a message that is related to the sixth user account and that includes a participant tag. When the sixth user account logging on to the current client accesses an aggregate display interface of a seventh user account, a message that is related to the sixth user account and the seventh user account and that includes a participant tag is browsed on the fourth aggregate display interface.

Accordingly, the aggregate display interface entry includes a third aggregate display interface entry and a fourth aggregate display interface entry.

For example, the third aggregate display interface entry may be on a personal details interface of the sixth user account, on a social circle display interface of the sixth user account, on a function interface of an application program, or the like. A display position of the third aggregate display interface entry is not limited in the disclosure.

For example, the fourth aggregate display interface entry may be on a personal data interface of the seventh user account, on a social circle display interface of the seventh user account, or the like. For example, the personal data interface of the seventh user account is displayed by clicking an avatar of the seventh user account, and the fourth aggregate display interface is displayed by using a trigger operation on the fourth aggregate display interface entry on the personal data interface. In some embodiments, a social circle of the seventh user account is first triggered to be displayed, and the fourth aggregate display interface is displayed by using a trigger operation on the fourth aggregate display interface entry on a social circle message display interface.

Operation 840: Display at least one tag message aggregately on the aggregate display interface.

For example, the tag message includes the message that is related to the sixth user account and that includes the participant tag. The sixth user account is the user account logging on to the current client. The participant tag is used for indicating a participant of message content of the tag message.

For example, the aggregate display interface includes the third aggregate display interface and the fourth aggregate display interface.

For example, at least one third tag message is displayed aggregately on the third aggregate display interface. The third tag message includes the message that is related to the first user account and that includes the participant tag.

The third tag message includes at least one of the following:
- a message that is posted by the sixth user account and that includes a participant tag; and
- a message posted by another user account except the sixth user account, a participant tag corresponding to the message including the sixth user account.

For example, at least one fourth tag message is displayed aggregately on the fourth aggregate display interface. The fourth tag message includes the message that is related to the sixth user account and the seventh user account and that includes the participant tag. The seventh user account is a user account currently accessed by the sixth user account.

The fourth tag message includes at least one of the following:
- a message posted by the sixth user account, a participant user account corresponding to the message including the seventh user account; and a message posted by the seventh user account, a participant user account corresponding to the message including the sixth user account; and a message posted by another user, a participant user account corresponding to the message including both the sixth user account and the seventh user account.

In some embodiments, images in messages are displayed on the aggregate display interface in a multi-image merged display mode. In this way, as many images as possible may be displayed in limited space, so that a user may be immersed in browsing, and an atmosphere of the aggregate display interface is denser.

In some embodiments, access of aggregate display interfaces between users is limited to some extent according to enabled permissions between user accounts, so as to, for example, enhance the privacy of the aggregate display interface.

An example in which the message is a moment message, user accounts B and C are tagged, when a user account A posts a moment message, as participants of the message, and the aggregate display interface is a memory photo album is used in a possible implementation to show differences of aggregate display interfaces seen by the user in different cases.

In actual applications, if the sixth user account revokes an access permission of the seventh user account for a social circle of the sixth user account (blacklists/sets "chats only"/ "hide my posts") after tagging the seventh user account as the participant user account of the message, the message is retained on aggregate display interfaces for access of the sixth user account and the seventh user account to themselves, the message is also retained on an aggregate display interface for access of the sixth user account to the seventh user account, but there is no entry to an aggregate display interface for access of the seventh user account to the sixth user account.

For example, if the user account A blacklists the user account B, sets "chats only" for the user account B, or hides posts to the user account B after tagging, when posting a moment, the user accounts B and C as participants of the moment, the user account A and the user account B may still view the moment in memory photo albums of the user account A and the user account B, the user account A may view the moment in the memory photo album of the user account B, but there is no entry for the user account B to access the memory photo album of the user account A. C may still view the moment in the memory photo albums of the user account A and the user account B, without any impact.

For example, if the sixth user account deletes the seventh user account after tagging the seventh user account as the participant user account of the message, the message is retained on the aggregate display interfaces for access of the sixth user account and the seventh user account to themselves, but there are no entries to aggregate display interfaces for access of the sixth user account and the seventh user account to each other.

For example, if the user account A deletes the user account B after tagging, when posting a moment, the user accounts B and C as participants of the moment, the user account A and the user account B may still view the moment in memory photo albums of the user account A and the user account B, but there are no entries to the memory photo albums of each other. The user account C may still view the moment in the memory photo albums of the user account A and the user account B, without any impact.

For example, after tagging the seventh user account as the participant user account of the message, if the sixth user account sets that only the sixth user account has a permission to view the message, the message is displayed on only the aggregate display interface on which the sixth user account views the sixth user account and an aggregate display interface on which the sixth user account views the seventh user account, and the seventh user account cannot view the message.

For example, after tagging, when posting a moment, the user accounts B and C as participants of the moment, if the user account A dynamically sets the moment private ("me only"), the user account A may view the moment in memory photo albums of the user account A and the user account B, but the user account B and the user account C cannot view the moment on any interface.

For example, if the sixth user account deleting the message after tagging the seventh user account as the participant user account of the message, the message is not displayed on any aggregate display interface.

For example, after tagging, when posting a moment, the user account B and the user account C as participants of the moment, if the user account A deletes the moment, no one can view the moment on any interface.

In summary, according to the method provided in this embodiment of the disclosure, the social circle message that is related to the user and that includes the participant tag is displayed on the aggregate display interface. In this way, the user can efficiently find the social circle message including the participant tag. This enriches dimensions of information carried in the message, and adds valid information carried in the message. In addition, by browsing an aggregate display interface of a friend user, the user can remember activities the user participates in together with the friend, so that socializing between user accounts is enhanced, and socializing quality is improved.

Figure 12:
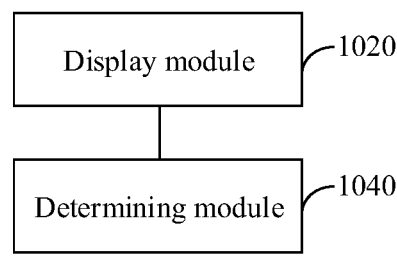
FIG. 12 is a block diagram of a structure of a message display apparatus according to some embodiments of this application.

FIG. 12 is a block diagram of a structure of a message display apparatus according to some embodiments of the disclosure. A first user account logs on to the apparatus. The apparatus includes:
- a display module 1020, configured to display a first message in an editing state; and
- a determining module 1040, configured to determine, in response to a selection operation on a candidate user account, a user account selected from the candidate user account as a participant user account of the first message.

The display module 1020 is further configured to display, after editing of the first message is completed, the first message including a first participant tag.

The first message including the first participant tag is in a posted state. The first participant tag is used for indicating that an object corresponding to the participant user account is a participant of message content of the first message.

In some embodiments, a first user interface includes a participant tag entry. The display module 1020 is configured to display a participant selection user interface in response to a trigger operation on the participant tagging entry. The participant selection user interface includes at least one candidate user account. The determining module 1040 is configured to determine, in response to the selection operation on the candidate user account, the user account selected from the candidate user account as the participant user account of the first message.

In some embodiments, the candidate user account is a user account satisfying a tagging condition in contacts of the first user account. The tagging condition is that the user account has an access permission for a social circle of the first user account.

In some embodiments, the determining module 1040 is configured to filter a user account without the access permission out of the contacts. The determining module 1040 is configured to determine a remaining user account after filtering as the user account satisfying the tagging condition. The user account without the access permission includes at least one of the following user accounts: a user account added to a contact blacklist by the first user account; a user account deleted by the first user account from the contacts; and a user account whose access permission for the social circle is revoked by the first user account.

In some embodiments, the first participant tag includes identification information corresponding to the participant user account and description information for representing participation.

In some embodiments, the display module 1020 is configured to display at least one first tag message on a first aggregate display interface. The first tag message includes a social circle message that is related to the first user account and that includes a participant tag.

In some embodiments, the first tag message includes at least one of the following: a social circle message that is posted by the first user account and that includes a participant tag; and a social circle message that is posted by another user account except the first user account and whose participant tag includes the first user account.

In some embodiments, the first tag message includes a second message posted by a second user account. A participant user account of the second message includes the first user account. The display module 1020 is configured to cancel displaying of the second message on the first aggregate display interface based on a social relationship between the first user account and the second user account is released.

In some embodiments, the display module 1020 is configured to: display a reediting entry in response to a posting operation on the first message based on a social relationship between the participant user account and the first user account is released; and display the first user interface in response to a trigger operation on the reediting entry. The first user interface includes the first message resumed to the editing state.

Figure 13:
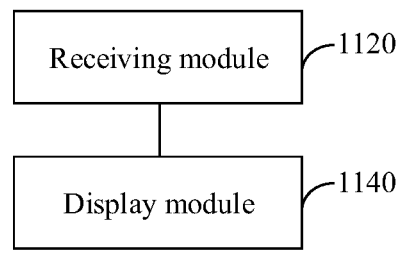
FIG. 13 is a block diagram of a structure of a message display apparatus according to some embodiments of this application.

FIG. 13 is a block diagram of a structure of a message display apparatus according to some embodiments of the disclosure. A second user account logs on to the apparatus. The apparatus includes:

- a receiving module 1120, configured to receive a first message posted by a first user account; and
- a display module 1140, configured to display the first message, the first message including a second participant tag, and the second participant tag being used for indicating that an object corresponding to at least one participant user account is a participant of message content of the first message.

In some embodiments, the display module 1140 is configured to display the first message including the second participant tag on a third user interface. The second participant tag includes a participant user account satisfying a display condition. The display condition includes at least one of the following conditions: the participant user account is the third user account; and the participant user account is in a social relationship with the third user account.

In some embodiments, the display condition further includes that: the participant user account is in a social relationship with the first user account; or the participant user account has an access permission for a social circle message of the first user account.

In some embodiments, the display condition further includes that: the participant user account is not set to reject to be displayed as the participant of the message content of the first message.

In some embodiments, that the participant user account has the access permission for the social circle message of the first user account includes that: the participant user account does not add the first user account to a contact blacklist; the participant user account does not delete the first user account from contacts; the participant user account is not set to enable a chat permission for only the first user account; and the participant user account is not set to block the social circle message of the first user account.

In some embodiments, that the participant user account has the access permission for the social circle message of the first user account includes that: the participant user account does not add the first user account to a contact blacklist; the participant user account does not delete the first user account from contacts; the participant user account is not set to enable a chat permission for only the first user account; and the participant user account is not set to block the social circle message of the first user account.

In some embodiments, the participant user account includes the third user account. The display module 1140 is configured to cancel, in response to a display rejection operation on the first message, displaying of identification information corresponding to the third user account in the second participant tag.

In some embodiments, the participant user account includes the third user account. The receiving module 1120 is configured to receive a reminding message. The reminding message is used for indicating that the third user account is tagged as a participant user account of the first message.

In some embodiments, the display module 1140 is configured to display at least one second tag message on a second aggregate display interface. The second tag message includes a social circle message that is related to the third user account and a fourth user account and that includes a participant tag. The fourth user account is a user account currently accessed by the third user account.

In some embodiments, the second tag message includes at least one of the following: a social circle message that is posted by the third user account and whose participant user account includes the fourth user account; a social circle message that is posted by the fourth user account and whose participant user account includes the third user account; and a social circle message that is posted by another user and whose participant user account includes both the third user account and the fourth user account.

In some embodiments, the second tag message includes a third message posted by a fifth user account. A participant of the third message includes the third user account and the fourth user account. The display module 1140 is configured to cancel displaying of the third message on a second aggregate display interface based on a social relationship with the fifth user account is released, or cancel displaying of the third message on a second aggregate display interface based on a social relationship between the fourth user account and the fifth user account is released.

Figure 14:
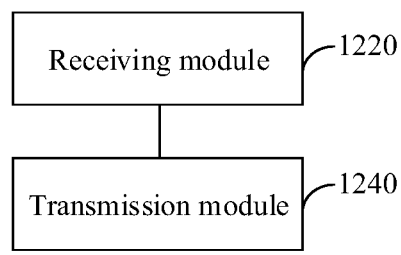
FIG. 14 is a block diagram of a structure of a message forwarding apparatus according to some embodiments of this application.

FIG. 14 is a block diagram of a structure of a message forwarding apparatus according to some embodiments of the disclosure. The apparatus includes:

- a receiving module 1220, configured to receive a first message posted by a first user account, the first message including a first participant tag, and the first participant tag being used for indicating that an object corresponding to a participant user account of the first message is a participant of message content of the first message; and
- a transmission module 1240, configured to transmit the first message to a second client, a third user account logging on to the second client, and the third user account being a user account in a social relationship with the first user account.

In some embodiments, the transmission module 1240 is configured to: screen a user account satisfying a display condition from the participant user account of the first message; generate a second participant tag of the first message according to the user account satisfying the display condition; and transmit a first message including the second participant tag to the second client.

In some embodiments, the transmission module 1240 is configured to transmit a reminding message to the second client. The reminding message is used for indicating that the third user account is tagged as the participant user account of the first message.

Figure 15:
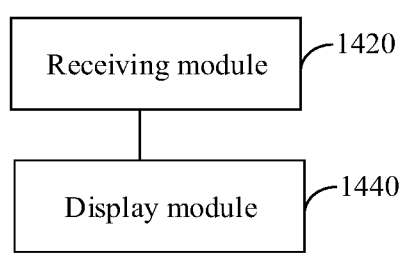
FIG. 15 is a block diagram of a structure of a message display apparatus according to some embodiments of this application.

FIG. 15 is a block diagram of a structure of a message display apparatus according to a schematic embodiment of the disclosure. The apparatus includes:

- a receiving module 1420, configured to receive a viewing operation on an aggregate display interface; and
- a display module 1440, configured to display at least one tag message aggregately on the aggregate display interface in response to the viewing operation, the tag message including a message that is related to a sixth user account and that includes a participant tag, the sixth user account being a user account logging on to a current client, and the participant tag being used for indicating a participant of message content of the tag message.

In some embodiments, the aggregate display interface includes a third aggregate display interface. The display module 1440 is configured to display at least one third tag message aggregately on the third aggregate display interface. The third tag message includes a message that is related to the sixth user account and that includes a participant tag. The third tag message includes at least one of the following: a message that is posted by the sixth user account and that includes a participant tag; and a message that is posted by another user account except the sixth user account and whose participant tag includes the sixth user account.

In some embodiments, the aggregate display interface includes a fourth aggregate display interface. The display module 1440 is configured to display at least one fourth tag message aggregately on a fourth aggregate display interface. The fourth tag message includes a message that is related to the sixth user account and a seventh user account and that includes a participant tag. The seventh user account is a user account currently accessed by the sixth user account. The fourth tag message includes at least one of the following: a message that is posted by the sixth user account and whose participant user account includes the seventh user account; a message that is posted by the seventh user account and whose participant user account includes the sixth user account; and a message that is posted by another user and whose participant user account includes both the sixth user account and the seventh user account.

It is to be noted that division of the functional modules of the message display apparatus provided in the foregoing embodiment is used merely as an example for description. In actual applications, depending on a requirement, the functions may be allocated to different functional modules for implementation, that is, an internal structure of the apparatus is divided into different functional modules to implement all or some of the functions described above. In addition, the message display apparatus provided in the foregoing embodiment belongs to the same concept as the message display method, and details about a specific implementation process of the apparatus refer to the method embodiment, and will not be elaborated herein.

Similarly, division of the functional modules of the message forwarding apparatus provided in the foregoing embodiment is used merely as an example for description. In actual applications, depending on a requirement, the functions may be allocated to different functional modules for implementation, that is, an internal structure of the apparatus is divided into different functional modules to implement all or some of the functions described above. In addition, the message forwarding apparatus provided in the foregoing embodiment belongs to the same concept as the message forwarding method, and details about a specific implementation process of the apparatus refer to the method embodiment, and will not be elaborated herein.

This application also provides a computer device (a terminal). The computer device includes a processor and a memory. The memory stores at least one instruction. The at least one instruction is loaded and executed by the processor to implement the message display method provided in each of the foregoing method embodiments. It is to be noted that the computer device may be a computer device provided in the following FIG. 16.

Figure 16:
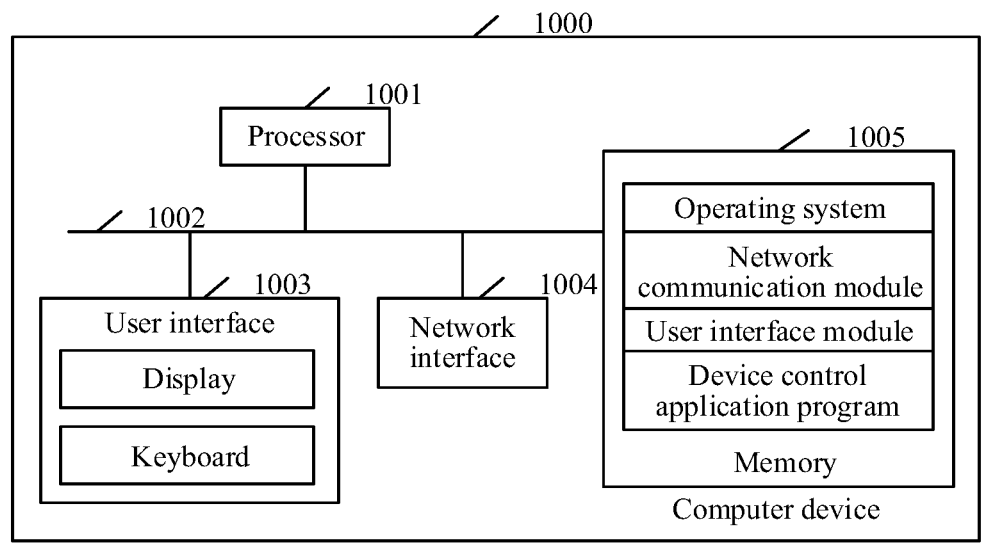
FIG. 16 is a block diagram of a terminal according to some embodiments of this application.

As shown in FIG. 16, the computer device 1000 may include a processor 1001, a network interface 1004, and a memory 1005. In addition, the computer device 1000 may further include a target user interface 1003 and at least one communication bus 1002. The communication bus 1002 is configured to implement connection communication between these components. The target user interface 1003 may include a display and a keyboard. Optionally, the target user interface 1003 may further include a standard wired interface and wireless interface. Optionally, the network interface 1004 may include a standard wired interface and wireless interface (for example, a wireless fidelity (Wi-Fi interface)). The memory 1005 may be a high-speed random access memory (RAM), or may be a non-volatile memory, for example, at least one disk memory. Optionally, the memory 1005 may be at least one storage apparatus far away from the processor 1001. As shown in FIG. 13, as a computer-readable storage medium, the memory 1005 may include an operating system, a network communication module, a target user interface module, and a device control application program.

In the computer device 1000 shown in FIG. 16, the network interface 1004 may provide a network communication function. The target user interface 1003 is mainly configured to provide an input interface for a target user. The processor 1001 may be configured to call the device control application program stored in the memory 1005 to implement a message display method.

It is to be understood that the computer device 1000 described in this embodiment of the disclosure may execute the descriptions about the message display methods in the embodiments corresponding to FIG. 4, FIG. 5, and FIG. 11. Elaborations are omitted herein.

Figure 17:
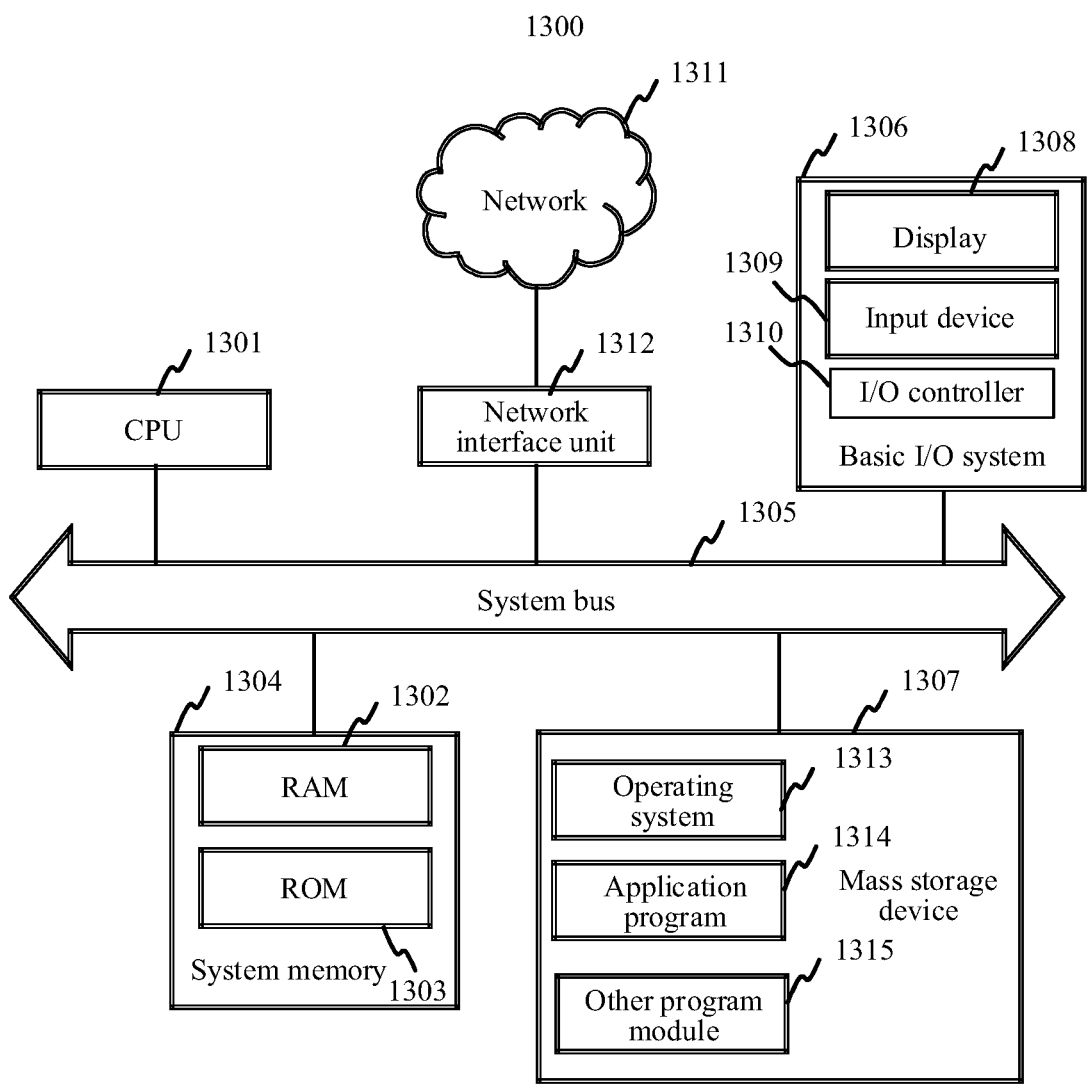
FIG. 17 is a block diagram of a server according to some embodiments of this application.

FIG. 17 is a schematic diagram of a structure of a server according to an exemplary embodiment. The server 1300 includes a central processing unit (CPU) 1301, a system memory 1304 including a RAM 1302 and a read-only memory (ROM) 1303, and a system bus 1305 that connects the system memory 1304 to the CPU 1301. The server 1300 further includes a basic I/O system 1306 that helps information transmission between devices in the server, and a mass storage device 1307 configured to store an operating system 1313, an application program 1314, and another program module 1315.

The basic I/O system 1306 includes a display 1308 configured to display information and an input device 1309 configured for a user to input information, for example, a mouse or a keyboard. Both the display 1308 and the input device 1309 are connected to the CPU 1301 by using an I/O controller 1310 connected to the system bus 1305. The basic I/O system 1306 may further include the I/O controller 1310 configured to receive and process inputs of a plurality of other devices such as the keyboard, the mouse, or an electronic stylus. Similarly, the I/O controller 1310 further provides an output to a display screen, a printer, or another type of output device.

The mass storage device 1307 is connected to the CPU 1301 by using a mass storage controller (not shown) connected to the system bus 1305. The mass storage device 1307 and a computer device readable medium associated therewith provide non-volatile storage for the server 1300. That is, the mass storage device 1307 may include a computer device readable medium (not shown), for example, a hard disk or a compact disc read-only memory (CD-ROM).

Without loss of generality, the computer device readable medium may include a non-transitory computer device storage medium and a communication medium. The computer device storage medium includes volatile/nonvolatile and removable/irremovable media implemented by any method or technology to store information, for example, a computer device readable instruction, a data structure, a program module, or other data. The computer device storage medium includes a RAM, a ROM, an erasable programmable read-only memory (EEPROM), an electrically erasable programmable read-only memory (EEPROM), a CD-ROM, a digital video disc (DVD) or another optical storage, a cassette tape, a magnetic tape, and a disk memory or another magnetic storage device. Certainly, it is to be known by a person skilled in the art that the computer device storage medium is not limited to the foregoing. The system memory 1304 and the mass storage device 1307 may be collectively referred to as memories.

According to various embodiments of the disclosure, the server 1300 may further be connected to a remote computer device on a network for running through the Internet or another network. That is, the server 1300 may be connected to a network 1311 through a network interface unit 1312 connected to the system bus 1305, or may be connected to another type of network or a remote computer device system (not shown) through a network interface unit 1312.

The memory further includes one or more programs. The one or more programs are stored in the memory. The CPU 1301 executes the one or more programs to implement all or some operations of the message forwarding method.

This application provides a non-transitory computer-readable storage medium. The storage medium stores at least one instruction. The at least one instruction is loaded and executed by a processor to implement the message display method or the message forwarding method provided in each of the foregoing method embodiments.

This application also provides a computer program product. When the computer program product is run on a computer, the computer is enabled to perform the message display method or the message forwarding method provided in each of the foregoing method embodiments.

The sequence numbers of the embodiments of the disclosure are only for description and do not represent superiority-inferiority of the embodiments.

It may be understood by a person of ordinary skill in the art that all or some operations in the foregoing embodiments may be completed by using hardware, or by using a program instructing related hardware. The program may be stored in a computer-readable storage medium. The storage medium may be a ROM, a magnetic disk, an optical disk, or the like.

The foregoing descriptions are merely optional embodiments of the disclosure and not intended to limit the disclosure. Any modification, equivalent replacement, or improvement made within the spirit and principle of the disclosure shall fall within the protection scope of the disclosure.

What is claimed is:

1. A message display method, the method being performed by a computer device, a first client being set in the computer device, a first user account logging on to the first client, and the method comprising:
   displaying a first message in an editing state;
   determining, in response to a selection operation on a candidate user account, a user account selected from the candidate user account as a participant user account of the first message; and
   displaying, after editing of the first message is completed, the first message comprising a first participant tag,
   the first message comprising the first participant tag being in a posted state, and the first participant tag being used for indicating that an object corresponding to the participant user account is a participant of message content of the first message.

2. The method according to claim 1, wherein the displaying a first message in an editing state comprises:
   displaying the first message in the editing state on a first user interface, the first user interface comprising a participant tag entry; and
   wherein the determining comprises:
   displaying at least one candidate user account in response to a trigger operation on the participant tag entry; and
   further determining, in response to the selection operation on the candidate user account, the user account selected from the candidate user account as the participant user account of the first message.

3. The method according to claim 2, wherein the first message is a social circle message, the candidate user account is a user account satisfying a tagging condition in contacts of the first user account, and the tagging condition is that there is an access permission for a social circle of the first user account.

4. The method according to claim 3, further comprising:
filtering a user account without the access permission out of the contacts, and determining a remaining user account after filtering as the user account satisfying the tagging condition,
the user account without the access permission comprising at least one of the following user accounts:
a user account in a contact blacklist of the first user account; and
a user account without the access permission for the social circle of the first user account.

5. The method according to claim 1, wherein the first participant tag comprises identification information of the participant user account and description information for representing participation.

6. The method according to claim 1, further comprising:
displaying at least one first tag message, the first tag message comprising a message that is related to the first user account and that comprises a participant tag.

7. The method according to claim 6, wherein the first tag message comprises at least one of the following:
a message that is posted by the first user account and that comprises a participant tag; and
a target message that is posted by another user account and that comprises a participant tag, a participant user account corresponding to the target message comprising the first user account.

8. The method according to claim 7, wherein the first tag message comprises a second message posted by a second user account, a participant user account of the second message comprises the first user account, the second user account is in a social relationship with the first user account, and the method further comprises:
canceling displaying of the second message based on the social relationship between the first user account and the second user account is released.

9. The method according to claim 1, wherein before the displaying the first message comprising a first participant tag, the method further comprises:
displaying a reediting entry in response to a posting operation on the first message based on a social relationship between the participant user account and the first user account is released; and
displaying, in response to a trigger operation on the reediting entry, the first message that is resumed to the editing state.

10. The method according to claim 1, the method further being performed by a second computer device, a second client being set in the second computer device, a third user account logging on to the second client, and the method comprising:
receiving, at the second computer device, the first message posted by a first user account; and
displaying, at the second computer device, the first message, the first message comprising a second participant tag, and the second participant tag being used for indicating that an object corresponding to at least one participant user account is a participant of message content of the first message.

11. A message display apparatus, comprising:
at least one memory configured to store program code; and
at least one processor configured to read the program code and operate as instructed by the program code, the program code comprising:
display code configured to cause the at least one processor to display a first message in an editing state;
determining code configured to cause the at least one processor to determine, in response to a selection operation on a candidate user account, a user account selected from the candidate user account as a participant user account of the first message; and
post-editing display code configured to cause the at least one processor to display, after editing of the first message is completed, the first message comprising a first participant tag, the first message comprising the first participant tag being in a posted state, and the first participant tag being used for indicating that an object corresponding to the participant user account is a participant of message content of the first message.

12. The apparatus of claim 11, wherein the display code is further configured to cause the at least one processor to display the first message in the editing state on a first user interface, the first user interface comprising a participant tag entry, and display at least one candidate user account in response to a trigger operation on the participant tag entry; and
wherein the determining code is configured to cause the at least one processor to, in response to the selection operation on the candidate user account, determine the user account selected from the candidate user account as the participant user account of the first message.

13. The apparatus according to claim 12, wherein the first message is a social circle message, the candidate user account is a user account satisfying a tagging condition in contacts of the first user account, and the tagging condition is that there is an access permission for a social circle of the first user account.

14. The apparatus according to claim 13, further comprising:
filtering code configured to cause the at least one processor to filter a user account without the access permission out of the contacts;
wherein the determining code is configured to cause the at least one processor to determine a remaining user account after filtering as the user account satisfying the tagging condition, the user account without the access permission comprising at least one of the following user accounts:
a user account in a contact blacklist of the first user account; and
a user account without the access permission for the social circle of the first user account.

15. The apparatus according to claim 11, wherein the first participant tag comprises identification information of the participant user account and description information for representing participation.

16. The apparatus according to claim 11, wherein the display code is further configured to cause the at least one processor to display at least one first tag message, the first tag message comprising a message that is related to the first user account and that comprises a participant tag.

17. The apparatus according to claim 16, wherein the first tag message comprises at least one of the following:
a message that is posted by the first user account and that comprises a participant tag; and a target message that is posted by another user account and that comprises a participant tag, a participant user account corresponding to the target message comprising the first user account.

18. The apparatus according to claim 17, wherein the first tag message comprises a second message posted by a second user account, a participant user account of the second message comprises the first user account, the second user account is in a social relationship with the first user account, and the program code further comprises:

canceling code configured to cause the at least one processor to cancel displaying of the second message based on the social relationship between the first user account and the second user account is released.

19. The apparatus according to claim 11, wherein the displaying code is configured to cause the at least one processor to display a reediting entry in response to a posting operation on the first message based on a social relationship between the participant user account and the first user account is released, and to display, in response to a trigger operation on the reediting entry, the first message that is resumed to the editing state.

20. A non-transitory computer-readable medium storing computer code that when executed by at least one processor causes the at least one processor to:

display a first message in an editing state;

determine, in response to a selection operation on a candidate user account, a user account selected from the candidate user account as a participant user account of the first message; and display, after editing of the first message is completed, the first message comprising a first participant tag, the first message comprising the first participant tag being in a posted state, and the first participant tag being used for indicating that an object corresponding to the participant user account is a participant of message content of the first message.

* * * * *